United States Patent
Saggar et al.

(10) Patent No.: US 12,445,332 B2
(45) Date of Patent: Oct. 14, 2025

(54) NETWORK PARAMETER BASED WAVEFORM PARAMETERS

(71) Applicant: QUALCOMM Incorporated, San Diego, CA (US)

(72) Inventors: Hemant Saggar, San Diego, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 534 days.

(21) Appl. No.: 17/815,766

(22) Filed: Jul. 28, 2022

(65) Prior Publication Data

US 2024/0048417 A1 Feb. 8, 2024

(51) Int. Cl.
*H04L 12/66* (2006.01)
*H04L 27/26* (2006.01)
(Continued)

(52) U.S. Cl.
CPC ......... *H04L 27/2602* (2013.01); *H04W 72/04* (2013.01)

(58) Field of Classification Search
CPC . H04L 1/0001; H04L 25/03828; H04L 5/006; H04L 5/0064; H04L 5/0085; H04L 5/0087; H04L 25/0204; H04L 5/0096; H04L 25/03159; H04L 27/2605; H04L 27/2607; H04L 27/2613; H04B 17/336; H04B 7/063; H04B 17/318; H04B 7/0639;
(Continued)

(56) References Cited

U.S. PATENT DOCUMENTS 10,477,592 B2 11/2019 Zhang et al.
10,548,129 B2 1/2020 Fwu et al.
(Continued)

FOREIGN PATENT DOCUMENTS

EP 2566121 B1 3/2014
WO 2017189316 A1 11/2017
(Continued)

OTHER PUBLICATIONS

International Search Report and Written Opinion—PCT/US2023/069573—ISA/EPO—Oct. 13, 2023.
(Continued)

*Primary Examiner* — Kharye Pope
(74) *Attorney, Agent, or Firm* — Harrity & Harrity, LLP

(57) ABSTRACT

Various aspects of the present disclosure generally relate to wireless communication. In some aspects, a mobile station may receive, from a network node, an indication of a condition associated with switching between a first waveform and a second waveform or between a first set of waveform parameters for the first waveform and a second set of waveform parameters for the first waveform, wherein the condition is based at least in part on one or more network parameters. The mobile station may communicate, with the network node, using at least one of: the first waveform or the second waveform, or the first set of waveform parameters or the second set of waveform parameters, based at least in part on whether the condition is detected by the mobile station. Numerous other aspects are described.

30 Claims, 15 Drawing Sheets

(51) Int. Cl.
*H04W 52/24* (2009.01)
*H04W 72/04* (2023.01)

(58) Field of Classification Search
CPC .. H04B 7/145; H04W 24/08; H04W 72/0453; H04W 72/29; H04W 16/16; H04W 28/18; H04W 48/20; H04W 84/042; H04W 24/02; H04W 28/0215; H04W 56/001; H04W 74/0808; H04W 74/0816
See application file for complete search history.

(56) References Cited

U.S. PATENT DOCUMENTS

| | | | | |
|---|---|---|---|---|
| 11,201,774 | B2* | 12/2021 | Xing | H04L 27/2627 |
| 2018/0035423 | A1 | 2/2018 | Wang et al. | |
| 2018/0092086 | A1* | 3/2018 | Nammi | H04L 27/26025 |
| 2019/0173640 | A1* | 6/2019 | Luo | H04L 27/2613 |
| 2019/0380144 | A1 | 12/2019 | Luo et al. | |
| 2020/0052761 | A1* | 2/2020 | Nammi | H04B 7/0486 |
| 2020/0187071 | A1* | 6/2020 | Chen | H04W 72/543 |
| 2021/0168678 | A1* | 6/2021 | Deenoo | H04W 24/08 |
| 2023/0086079 | A1* | 3/2023 | Novlan | H04L 5/14 370/254 |
| 2023/0156681 | A1* | 5/2023 | Tooher | H04W 72/542 370/329 |
| 2023/0291523 | A1* | 9/2023 | Hasegawa | H04L 5/0094 |

FOREIGN PATENT DOCUMENTS

| | | | | |
|---|---|---|---|---|
| WO | WO-2021260655 A1 * | 12/2021 | | H04L 27/26025 |
| WO | 2022038583 A1 | 2/2022 | | |

OTHER PUBLICATIONS

Hofbauer C., "Design and Analysis of Unique Word OFDM", Dissertation, Klagenfurt, Jun. 2016, 210 Pages.

* cited by examiner

NETWORK PARAMETER BASED WAVEFORM PARAMETERS

FIELD OF THE DISCLOSURE

Aspects of the present disclosure generally relate to wireless communication and to techniques and apparatuses for network parameter based waveform parameters.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a mobile station for wireless communication. The mobile station may include a memory and one or more processors coupled to the memory. The one or more processors, based at least in part on information stored in the memory, may be configured to receive, from a network node, an indication of a condition associated with switching between a first waveform and a second waveform or between a first set of waveform parameters for the first waveform and a second set of waveform parameters for the first waveform, wherein the condition is based at least in part on one or more network parameters. The one or more processors, based at least in part on information stored in the memory, may be configured to communicate, with the network node, using at least one of: the first waveform or the second waveform, or the first set of waveform parameters or the second set of waveform parameters, based at least in part on whether the condition is detected by the mobile station.

Some aspects described herein relate to a network node for wireless communication. The network node may include a memory and one or more processors coupled to the memory. The one or more processors, based at least in part on information stored in the memory, may be configured to transmit an indication of a condition associated with a mobile station switching between a first waveform and a second waveform or between a first set of waveform parameters for the first waveform and a second set of waveform parameters for the first waveform, wherein the condition is based at least in part on one or more network parameters. The one or more processors, based at least in part on information stored in the memory, may be configured to communicate using at least one of: the first waveform or the second waveform, or the first set of waveform parameters or the second set of waveform parameters, based at least in part on whether the condition is detected by the network node.

Some aspects described herein relate to a method of wireless communication performed by a mobile station. The method may include receiving, by the mobile station and from a network node, an indication of a condition associated with switching between a first waveform and a second waveform or between a first set of waveform parameters for the first waveform and a second set of waveform parameters for the first waveform, wherein the condition is based at least in part on one or more network parameters. The method may include communicating, by the mobile station and with the network node, using at least one of: the first waveform or the second waveform, or the first set of waveform parameters or the second set of waveform parameters, based at least in part on whether the condition is detected by the mobile station.

Some aspects described herein relate to a method of wireless communication performed by a network node. The method may include transmitting, by the network node, an indication of a condition associated with a mobile station switching between a first waveform and a second waveform or between a first set of waveform parameters for the first waveform and a second set of waveform parameters for the first waveform, wherein the condition is based at least in part on one or more network parameters. The method may include communicating, by the network node, using at least one of: the first waveform or the second waveform, or the first set of waveform parameters or the second set of waveform parameters, based at least in part on whether the condition is detected by the network node.

Some aspects described herein relate to a non-transitory computer-readable medium that stores a set of instructions for wireless communication by a mobile station. The set of instructions, when executed by one or more processors of the mobile station, may cause the mobile station to receive, from a network node, an indication of a condition associated with switching between a first waveform and a second waveform or between a first set of waveform parameters for the first waveform and a second set of waveform parameters for the first waveform, wherein the condition is based at least in part on one or more network parameters. The set of instructions, when executed by one or more processors of the mobile station, may cause the mobile station to communicate, with the network node, using at least one of: the first waveform or the second waveform, or the first set of waveform parameters or the second set of waveform parameters, based at least in part on whether the condition is detected by the mobile station.

Some aspects described herein relate to a non-transitory computer-readable medium that stores a set of instructions for wireless communication by a network node. The set of instructions, when executed by one or more processors of the network node, may cause the network node to transmit an indication of a condition associated with a mobile station switching between a first waveform and a second waveform or between a first set of waveform parameters for the first waveform and a second set of waveform parameters for the first waveform, wherein the condition is based at least in part on one or more network parameters. The set of instructions, when executed by one or more processors of the network node, may cause the network node to communicate using at least one of: the first waveform or the second waveform, or the first set of waveform parameters or the second set of waveform parameters, based at least in part on whether the condition is detected by the network node.

Some aspects described herein relate to an apparatus for wireless communication. The apparatus may include means for receiving, from a network node, an indication of a condition associated with switching between a first waveform and a second waveform or between a first set of waveform parameters for the first waveform and a second set of waveform parameters for the first waveform, wherein the condition is based at least in part on one or more network parameters. The apparatus may include means for communicating, with the network node, using at least one of: the first waveform or the second waveform, or the first set of waveform parameters or the second set of waveform parameters, based at least in part on whether the condition is detected by the apparatus.

Some aspects described herein relate to an apparatus for wireless communication. The apparatus may include means for transmitting an indication of a condition associated with a mobile station switching between a first waveform and a second waveform or between a first set of waveform parameters for the first waveform and a second set of waveform parameters for the first waveform, wherein the condition is based at least in part on one or more network parameters. The apparatus may include means for communicating using at least one of: the first waveform or the second waveform, or the first set of waveform parameters or the second set of waveform parameters, based at least in part on whether the condition is detected by the apparatus.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
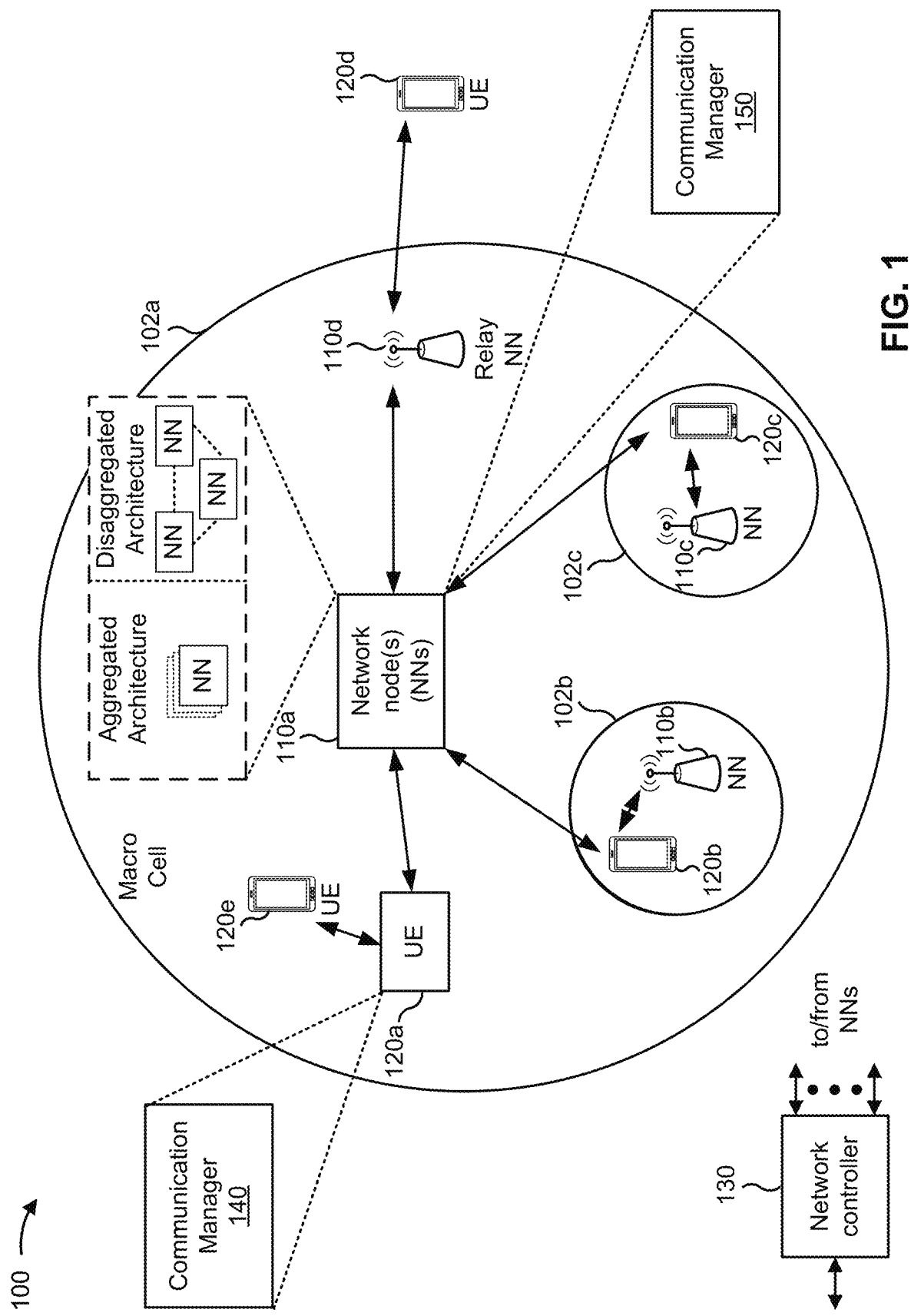
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. In some examples, a UE (e.g., a UE 120) may be referred to herein as a "mobile station." A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) MC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, an indication of a condition associated with switching between a first waveform and a second waveform or between a first set of waveform parameters for the first waveform and a second set of waveform parameters for the first waveform, wherein the condition is based at least in part on one or more network parameters; and communicate, with the network node, using at least one of: the first waveform or the second waveform, or the first set of waveform parameters or the second set of waveform parameters, based at least in part on whether the condition is detected by the UE 120. Additionally, or alternatively, the communication manager 140 may perform one or more other operations described herein.

In some aspects, the network node 110 may include a communication manager 150. As described in more detail elsewhere herein, the communication manager 150 may transmit an indication of a condition associated with a UE 120 switching between a first waveform and a second waveform or between a first set of waveform parameters for the first waveform and a second set of waveform parameters for the first waveform, wherein the condition is based at least in part on one or more network parameters; and communicate using at least one of: the first waveform or the second waveform, or the first set of waveform parameters or the second set of waveform parameters, based at least in part on whether the condition is detected by the network node. Additionally, or alternatively, the communication manager 150 may perform one or more other operations described herein.

As indicated above, FIG. 1 is provided as an example. Other examples may differ from what is described with regard to FIG. 1.

Figure 2:
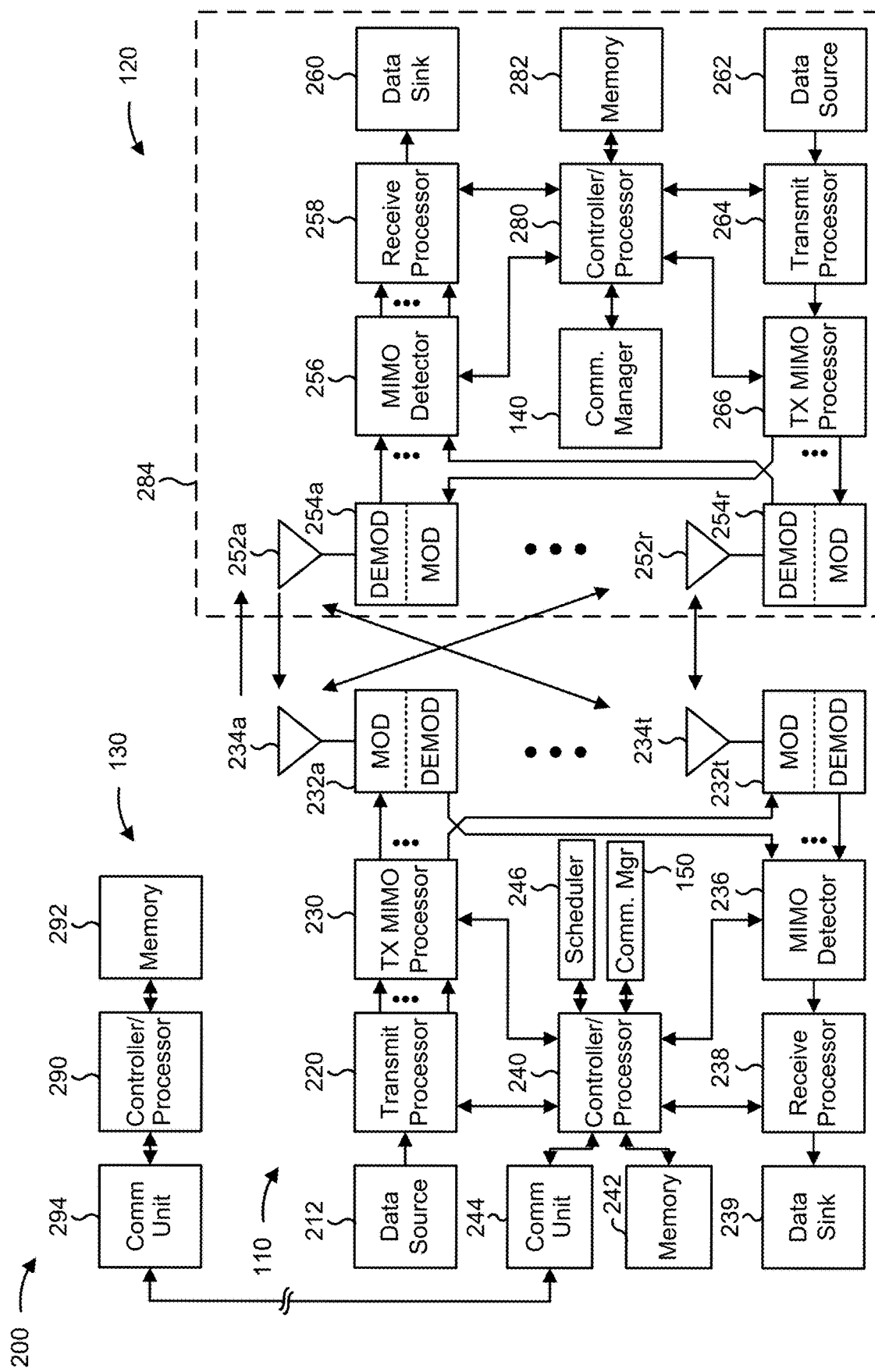
FIG. 2 is a diagram illustrating an example of a network node in communication with a user equipment (UE) in a wireless network, in accordance with the present disclosure.

FIG. 2 is a diagram illustrating an example 200 of a network node 110 in communication with a user equipment (UE) 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and one or more modems 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-15).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-15).

The controller/processor 240 of the network node 110, the controller/processor 280 of the UE 120, and/or any other component(s) of FIG. 2 may perform one or more techniques associated with network parameter based waveform parameters, as described in more detail elsewhere herein. In some aspects, the mobile station described herein is the UE 120, is included in the UE 120, or includes one or more components of the UE 120 shown in FIG. 2. The controller/processor 240 of the network node 110, the controller/processor 280 of the UE 120, and/or any other component(s) of FIG. 2 may perform or direct operations of, for example, process 1200 of FIG. 12, process 1300 of FIG. 13, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, the UE 120 includes means for receiving, from a network node, an indication of a condition associated with switching between a first waveform and a second waveform or between a first set of waveform parameters for the first waveform and a second set of waveform parameters for the first waveform, wherein the condition is based at least in part on one or more network parameters; and/or means for communicating, with the network node, using at least one of: the first waveform or the second waveform, or the first set of waveform parameters or the second set of waveform parameters, based at least in part on whether the condition is detected by the UE. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting an indication of a condition associated with a mobile station switching between a first waveform and a second waveform or between a first set of waveform parameters for the first waveform and a second set of waveform parameters for the first waveform, wherein the condition is based at least in part on one or more network parameters; and/or means for communicating using at least one of: the first waveform or the second waveform, or the first set of waveform parameters or the second set of waveform parameters, based at least in part on whether the condition is detected by the network node. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
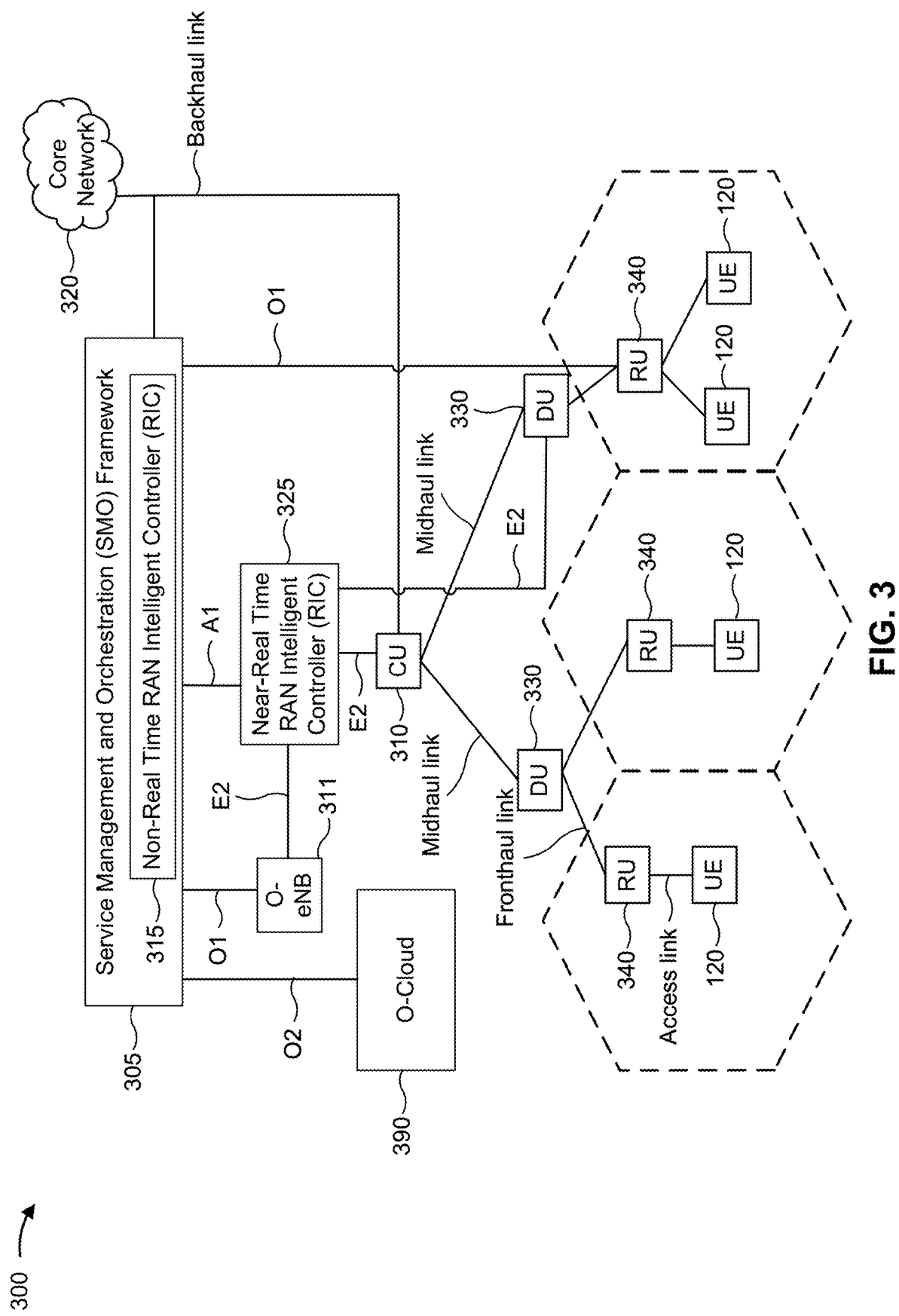
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
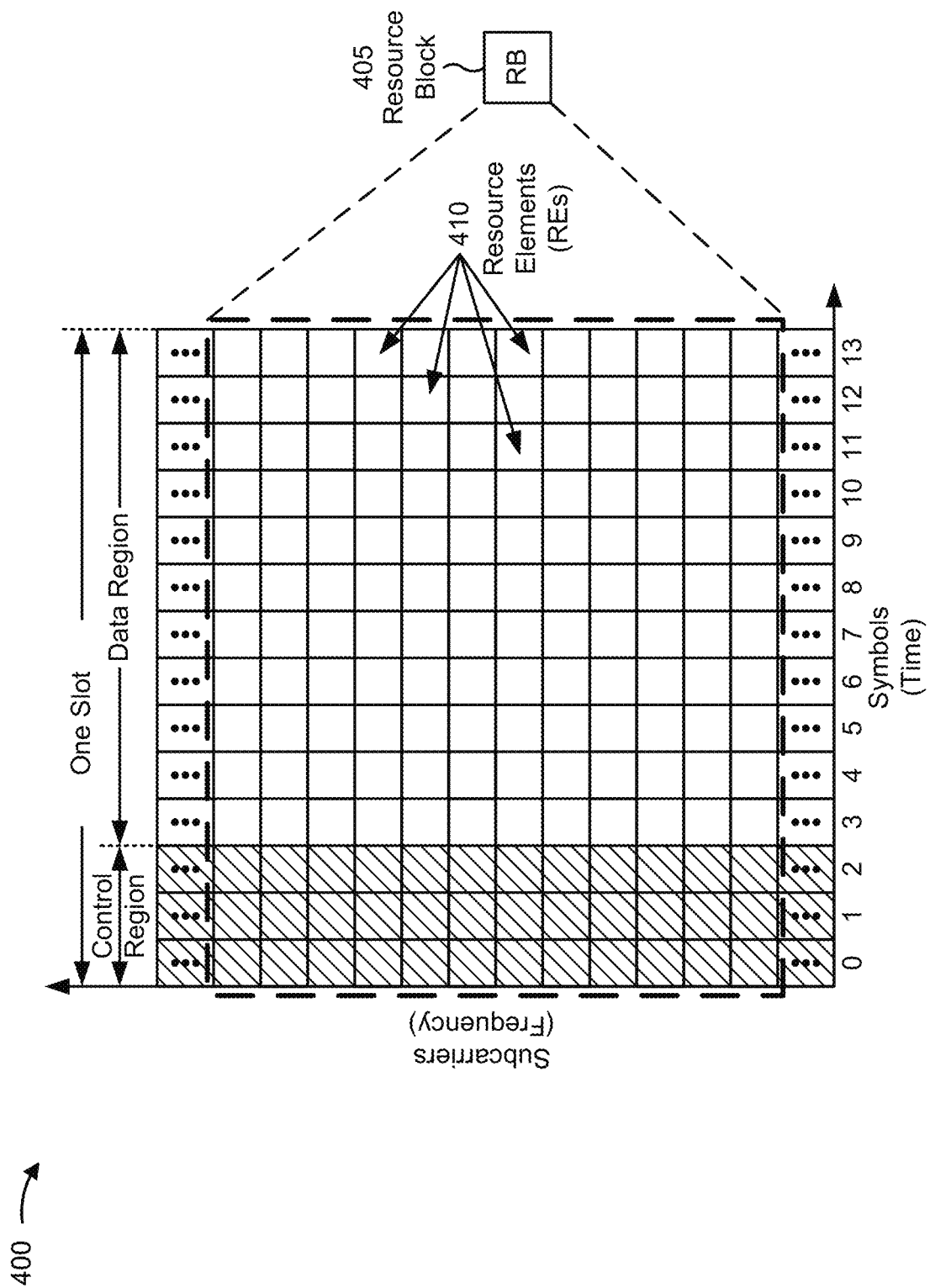
FIG. 4 is a diagram illustrating an example of a slot format, in accordance with the present disclosure.

FIG. 4 is a diagram illustrating an example 400 of a slot format, in accordance with the present disclosure. As shown in FIG. 4, time-frequency resources in a radio access network may be partitioned into resource blocks, shown by a single resource block (RB) 405. An RB 405 is sometimes referred to as a physical resource block (PRB). An RB 405 includes a set of subcarriers (e.g., 12 subcarriers) and a set of symbols (e.g., 14 symbols for CP-based waveforms or 15 symbols for guard interval (GI)-based waveforms, such as a unique word (UW) OFDM (UW-OFDM) waveform) that are schedulable by a network node 110 (e.g., a base station, a CU, or a DU) as a unit. In some examples, an RB 405 may include a set of subcarriers in a single slot. As shown, a single time-frequency resource included in an RB 405 may be referred to as a resource element (RE) 410. An RE 410 may include a single subcarrier (e.g., in frequency) and a single symbol (e.g., in time). A symbol may be referred to as an orthogonal frequency division multiplexing (OFDM) symbol. An RE 410 may be used to transmit one modulated symbol, which may be a real value or a complex value.

In some telecommunication systems (e.g., NR), RBs 405 may span 12 subcarriers with a subcarrier spacing of, for example, 15 kilohertz (kHz), 30 kHz, 60 kHz, or 120 kHz, among other examples, over a 0.1 millisecond duration. A radio frame may include 40 slots and may have a length of 10 milliseconds. Consequently, each slot may have a length of 0.25 milliseconds. However, a slot length may vary depending on a numerology used to communicate (e.g., a subcarrier spacing and/or a cyclic prefix format). A slot may be configured with a link direction (e.g., downlink or uplink) for transmission. In some examples, the link direction for a slot may be dynamically configured.

As indicated above, FIG. 4 is provided as an example. Other examples may differ from what is described with respect to FIG. 4.

Figure 5:
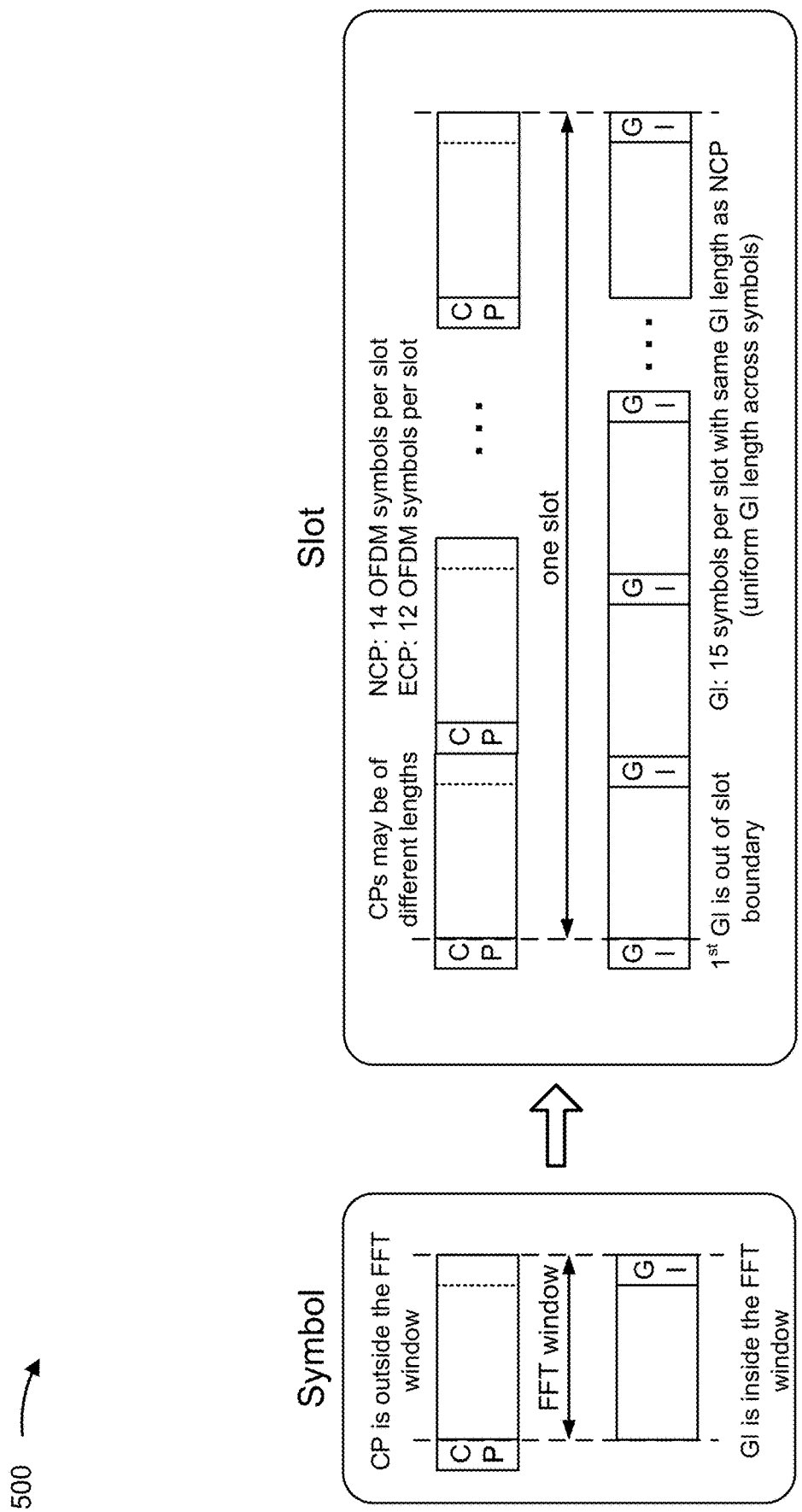
FIG. 5 is a diagram illustrating an example of a cyclic prefix (CP) and a guard interval (GI) for single carrier (SC) waveforms, in accordance with the present disclosure.

FIG. 5 is a diagram illustrating an example 500 of a cyclic prefix (CP) and a GI for single carrier (SC) waveforms, in accordance with the present disclosure.

A transmitter, such as the UE 120 or the network node 110, may include a short amount of data or space between symbols to mitigate interference between neighboring symbols. The short amount of data may be a CP, or a prefixing of a symbol, as shown in example 500. The CP may also provide an opportunity for a beam to switch between symbols. The CP may be contained within a slot boundary, may include random data, and may not be easily adaptable to delay spread, which is a difference between arrival of an earliest multi-path component and arrival of a last multi-path component. CPs may be of different lengths. CP is adopted in Long Term Evolution (LTE) and NR, and CP is adopted for WiFi OFDM symbols. In some examples, an \ extended cyclic prefix (ECP), rather than a normal cyclic prefix (NCP), may be used. As used herein, "cyclic prefix" or "CP" refers to a repetition of an end of a symbol (e.g., an OFDM symbol) before a beginning of the symbol. In 5G, a length of the "normal cyclic prefix" or "NCP" may be calculated according to an expression of the form $144\kappa \cdot 2^{-\mu}$ or $144\kappa \cdot 2^{-\mu}+16\kappa$, where $\kappa$ represents a time unit constant (e.g., often set to 64) and $\mu$ represents the SCS. Meanwhile, in 5G, a length of the "extended cyclic prefix" or "ECP" may be calculated according to an expression of the form $512\kappa \cdot 2^{-\mu}$.

Additionally, or alternatively, the transmitter may use a GI between symbols. The GI may be a specified period of time between symbols, to mitigate interference between the symbols. The GI may be a known sequence that can be utilized for synchronizing phase tracking. In some examples, the GI may be all zeroes (e.g., bits with a value of 0 or a transmission power of 0). The GI may be of uniform length across symbols. The GI may be more resource efficient than a CP. The GI may adapt to delay spreads without changing a symbol duration. The GI may be adopted for use with WiFi for SC frequency domain equalization (FDE) (SC-FDE).

The transmitter may use signal processing to generate a waveform for data content. The signal processing may involve linear convolution, which is an operation to calculate the output for a linear time invariant system. Linear convolution may use an FFT operation. A CP and a GI may both convert a linear convolution of transmitted symbols to a circular convolution, with a simple one-tap FDE at the receiver. Circular convolution calculates the output for a linear time invariant system but is periodic and utilizes the periodicity of samples in discrete Fourier transform (DFT). A CP and a GI may also help to maintain symbol and slot alignment.

Some communications may use a CP to help eliminate inter-symbol interference (ISI). The CP may be a repetition of information from a previous symbol that is used as a guard against ISI. A GI-based waveform can adapt to different delay spread without changing symbol duration and achieve better resource utilization. The GI-based waveform may be extended to DFT-s-OFDM. Some solutions may produce zero-tail (ZT) DFT-s-OFDM signals by adding zeros prior to a DFT input. The resulting communication may include data content and tail samples at the end to help mitigate interference (e.g., mitigate ISI).

As shown in FIG. 5, the CP may be outside of a DFT or FFT window associated with a symbol (e.g., the CP may be outside of an FFT window boundary associated with a symbol). The GI may be inside of the DFT or FFT window associated with the symbol (e.g., the GI may be inside of the FFT window boundary associated with the symbol). GI-based waveforms may enable the GI type and/or length to be adapted to channel and multipath conditions without changing the symbol length (e.g., because the GI may be inside of the FFT window boundary associated with the symbol). This may provide additional flexibility to adapt the GI-based waveform to varying channel or multipath conditions over time.

One example of a GI-based waveform is the UW-OFDM waveform. In a UW-OFDM waveform, the GI may be implemented as a deterministic sequence, referred to as a "unique word." For example, the UW-OFDM waveform enables any unique word (or sequence) to be generated within the GI of a symbol. The unique word may be used as a reference signal or a gap (e.g., in time). The unique word may be associated with one or more purposes, such as frequency domain tracking, phase tracking, noise estimation, and/or interference estimation, among other examples (e.g., in addition to mitigating inter-symbol interference (ISI)).

As indicated above, FIG. 5 is provided as an example. Other examples may differ from what is described with regard to FIG. 5.

Figure 6:
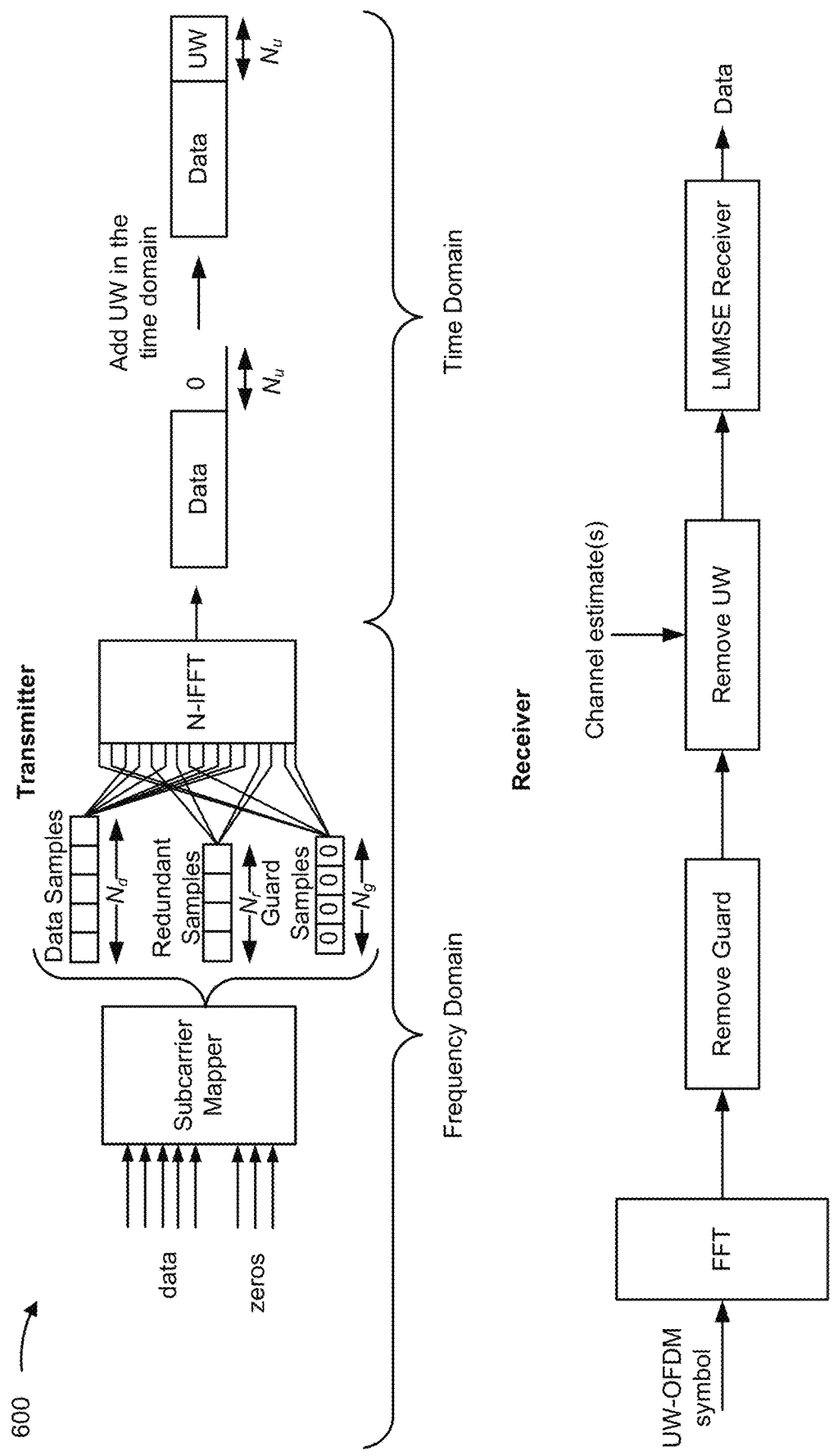
FIG. 6 is a diagram illustrating an example of signal processing associated with a unique word (UW) orthogonal frequency division multiplexing (OFDM) (UW-OFDM) waveform, in accordance with the present disclosure.

FIG. 6 is a diagram illustrating an example 600 of signal processing associated with a UW-OFDM waveform, in accordance with the present disclosure. FIG. 6 shows signal processing at a transmitter and a receiver. The transmitter may be a UE, a network node, or another wireless communication device. Similarly, the receiver may be a UE, a network node, or another wireless communication device.

As shown in FIG. 6, the transmitter may perform frequency domain processing and time domain processing to generate a UW-OFDM symbol. As shown in FIG. 6, the subcarrier mapper may map data samples, redundant samples, and guard samples (e.g., zero samples) to various subcarriers. Redundant samples may be used to help create a zero tail (e.g., a portion of the symbol that includes zeroed information bits or bits having a transmit power at, or close to, zero) at the end or start of the symbol. For example, a redundant subcarrier (e.g., a subcarrier mapped to a redundant sample) may be associated with higher power (e.g., compared to a data subcarrier that is mapped to a data sample). The redundant samples may be mapped to subcarriers prior to an iFFT input to create a block of zeroes (e.g., or a block of fixed samples) in the time domain.

For example, to create a block having a length Nu in the time domain, $N_r$ redundant samples or subcarriers may be introduced at the iFFT input. $N_r$ may be less than, greater than, or equal to Nu. In some examples, as shown in FIG. 6, the transmitter may first generate a zero-tail OFDM symbol by adding the $N_r$ redundant subcarriers (e.g., that are modulated to create a zero tail at the iFFT output). The transmitter may add or append a UW in the time domain (e.g., after generating the zero-tail OFDM symbol, the UW may be added or appended to the block of zeroes). The resulting UW-OFDM symbol may include data and the UW at the end (e.g., as shown in FIG. 6) or start of the UW-OFDM symbol. Alternatively, adding the redundant subcarriers may generate the UW in the time domain in a single step.

At the receiver, the UW-OFDM symbol may be provided as an input to an FFT block. The receiver may remove a guard band (e.g., in the frequency domain) from the FFT output. The receiver may remove the UW (e.g., using one or more channel estimates). After removing the UW, the symbol may be input to a linear minimum mean square error (LMMSE) receiver to extract the data carried by the UW-OFDM symbol.

As indicated above, FIG. 6 is provided as an example. Other examples may differ from what is described with regard to FIG. 6.

Figure 7:
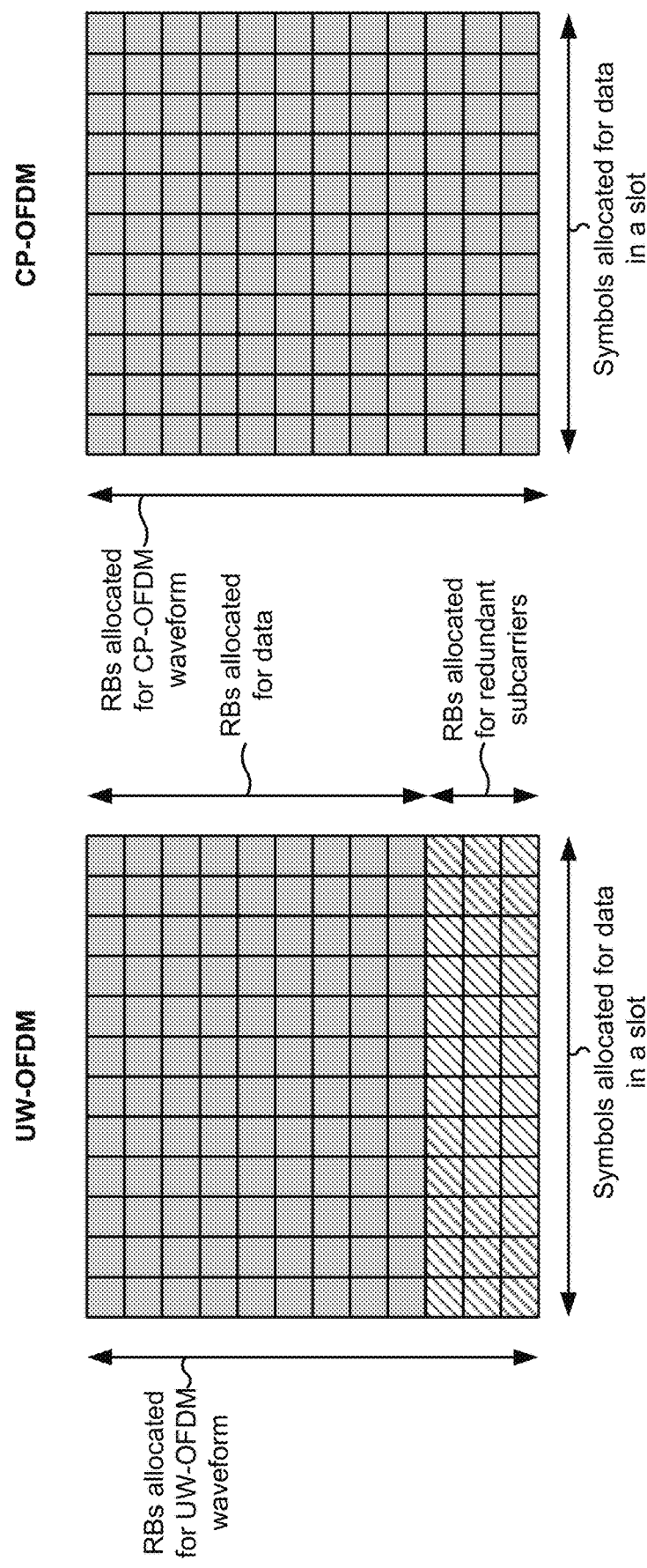
FIG. 7 is a diagram illustrating an example of bandwidth allocations for UW-OFDM waveforms and cyclic prefix orthogonal frequency division multiplexing (CP-OFDM) waveforms, in accordance with the present disclosure.

FIG. 7 is a diagram illustrating an example 700 of bandwidth allocations for UW-OFDM waveforms and CP- OFDM waveforms, in accordance with the present disclosure. FIG. 7 depicts an example of bandwidth allocations that result in a same transport block (TB) size and/or code rate for signals associated with a UW-OFDM waveform and a CP-OFDM waveform.

As described elsewhere herein, a quantity of symbols in each slot for signals associated with a UW-OFDM waveform and signals associated with a CP-OFDM waveform may be different. For example, in some cases, $K_{uw}$, symbols (e.g., physical downlink shared channel (PDSCH) symbols) may be included in each slot for the UW-OFDM waveform and $K_{cp}$ symbols (e.g., PDSCH symbols) may be included in each slot for the CP-OFDM waveform. In some cases, $K_{uw}$ may be greater than $K_{cp}$ (e.g., with 1 symbol in each slot allocated for a DMRS, $K_{uw}$ may be 14 and $K_{cp}$ may be 13). As shown in FIG. 7, a bandwidth allocation for the UW-OFDM waveform may include $M_{uw}$ RBs. The $M_{uw}$ RBs may include $M_{uw,d}$ RBs associated with data subcarriers and $M_{uw,r}$ RBs associated with redundant subcarriers. A bandwidth allocation for the CP-OFDM waveform may include $M_{cp}$ RBs. As shown in FIG. 7, the bandwidth allocation for the CP-OFDM waveform may not include any redundant subcarriers.

A quantity of REs in each slot associated data for the UW-OFDM waveform may be represented by $(M_{uw}-M_{uw,r})*12*K_{uw}$. A quantity of REs in each slot associated data for the CP-OFDM waveform may be represented by $M_{cp}*12*K_{cp}$. Therefore, to have an equivalent data size (e.g., TB size and/or code rate) for signals associated with the UW-OFDM waveform and the CP-OFDM waveform, $(M_{uw}-M_{uw,r})*12*K_{uw}=M_{cp}*12*K_{cp}$. Rewriting the previous equation, $$M_{uw} = M_{cp} * \left(\frac{K_{cp}}{K_{uw}}\right) + M_{uw,r}.$$

For example, assuming $K_{uw}=14$ and $K_{cp}=13$, for an allocation of $M_{cp}=168$, $M_{uw}=156+M_{uw,r}$. As another example, for an allocation of $M_{cp}=266$, $M_{uw}=247+M_{uw,r}$.

As explained elsewhere herein, redundant subcarriers may be added and/or mapped to certain subcarriers when generating a UW-OFDM signal to create a block of zero bits (e.g., a zero tail) in a UW-OFDM symbol. In some cases, a quality of a GI generated for the UW-OFDM waveform may be based at least in part on a quantity of redundant samples or subcarriers used to generate the UW-OFDM waveform. The quality of the GI may be measured by how close to a transmission power of zero the block zero bits (e.g., the zero tail) of the generated UW-OFDM symbol actually are (e.g., measured in mean square error). For example, a quality of the GI may degrade as the quantity of redundant subcarriers reduces (e.g., the block zero bits (e.g., the zero tail) of the generated UW-OFDM symbol may have some bits that are associated with a transmit power greater than zero when less redundant subcarriers are used). For example, as the quantity of redundant subcarriers for a given bandwidth allocation of a UW-OFDM symbol is increased, a mean GI sample power may move closer to zero. As the quantity of redundant subcarriers for a given bandwidth allocation of a UW-OFDM symbol is decreased, a mean GI sample power may increase (e.g., resulting in a degraded GI).

In some cases, a redundant subcarrier may be associated with a higher transmit power than a data subcarrier. Therefore, adding the redundant subcarriers results in an increased symbol energy for a UW-OFDM symbol. In order to comply with a transmit power limit (or symbol energy limit) and/or to maintain a constant output transmit power, a transmitter may reduce a transmit power for all subcarriers (e.g., data subcarriers and redundant subcarriers) that are included in the UW-OFDM symbol (e.g., the transmitter may perform a power backoff for all subcarriers). An amount of the power backoff may be proportionate to the excess power in redundant subcarriers as compared to data subcarriers that are included in the UW-OFDM symbol. Therefore, including additional redundant subcarriers in a UW-OFDM symbol may result in a larger power backoff for data subcarriers included in the UW-OFDM symbol.

As described elsewhere herein, a GI quality of a UW-OFDM symbol may reduce as the quantity of redundant subcarriers decreases. However, as the quantity of redundant subcarriers decreases, an error rate (e.g., a block error rate (BLER)) associated with the UW-OFDM symbol may also decrease (e.g., as the quantity of redundant subcarriers decreases, a BLER of the UW-OFDM symbol may improve). For example, the BLER of the UW-OFDM symbol may improve because reducing the quantity of redundant subcarriers may result in a reduced power backoff that is applied to data subcarriers included in the UW-OFDM symbol (e.g., resulting in an increased transmit power for the data subcarriers included in the UW-OFDM symbol). Therefore, an optimized quantity of redundant subcarriers to be associated with a UW-OFDM symbol may vary based on a desired GI quality, an allocated bandwidth, and/or an intended BLER performance, among other examples, associated with communications. For example, BLER may continually decrease as the quantity of redundant subcarriers is reduced. However, at a certain quantity of redundant subcarriers, the GI of the UW-OFDM waveform may be degraded to a point that ISI may begin to increase the BLER associated with the UW-OFDM waveform. Therefore, there may be a balance or tradeoff between ISI caused by a degraded GI and reduced BLER associated with reducing the quantity of redundant subcarriers for a signal using the UW-OFDM waveform.

As another example, throughput (e.g., which may be measured in megabits per second (Mbps)) associated with signals using a CP-OFDM waveform may typically be higher than signals using a UW-OFDM waveform (e.g., because the CP-OFDM waveform may not include redundant subcarriers). For example, to result in the same code rate, a signal using a UW-OFDM waveform may occupy a greater bandwidth than a signal using the CP-OFDM waveform (e.g., resulting in a lower throughput for the signal using the UW-OFDM waveform). However, if the quantity of redundant subcarriers for a certain bandwidth allocation is reduced, then after a certain point, the UW-OFDM waveform may use less RBs than the CP-OFDM waveform (e.g., to achieve the same code rate) (e.g., according to the equation $$M_{uw} = M_{cp} * \left(\frac{K_{cp}}{K_{uw}}\right) + M_{uw,r}$$

described above and based on a quantity of RBs allocated to a CP of the CP-OFDM waveform). Therefore, under certain operating conditions (e.g., certain signal-to-noise ratio (SNR) conditions), a quantity of redundant subcarriers of the UW-OFDM waveform may be reduced such that a quantity of data subcarriers associated with the UW-OFDM waveform may be increased to be greater than a quantity of data subcarriers associated with the CP-OFDM waveform for the same total bandwidth (e.g., the same total quantity of RBs). This may result in an increased TB size, increased code rate, and/or an increased peak throughput (e.g., a peak throughput may be a highest throughput achieved for wireless communication over a given time period). However, at other operating conditions (e.g., other SNR conditions), the quantity of redundant subcarriers of the UW-OFDM waveform (e.g., that enabled the increased quantity of data subcarriers) may result in a reduced throughput as compared to the CP-OFDM waveform (e.g., due to a degraded GI and/or increased ISI).

Therefore, using the same waveform parameters and/or the same waveform (e.g., between the UW-OFDM waveform and the CP-OFDM waveform) over time may result in degraded system performance as network conditions or other system parameters change. For example, after an initial configuration, a transmitter may use the same waveform parameters (e.g., a same quantity of redundant subcarriers, a same MCS, and/or a same TB size, among other examples) and/or the same waveform for communications with a receiver. Under certain network parameters or channel conditions, the waveform parameters and/or waveform used by the transmitter may become suboptimal (e.g., may result in a degraded throughput, and/or an increased BLER, among other examples). However, the transmitter may be unable to change or modify the waveform parameters and/or waveform used after the initial configuration (e.g., because the receiver may be unaware of changes to the waveform parameters and/or the waveform and changing the waveform parameters and/or the waveform may result in decoding errors and/or signal processing errors at the receiver). Additionally, signaling of an indication to switch the waveform parameters and/or waveform (e.g., based at least in part on detecting a change in network parameters or channel conditions) may introduce latency associated with transmitting communications and/or may consume additional network resources, among other examples.

Some techniques and apparatuses described herein enable network parameter based waveform parameters. For example, a UE (e.g., a mobile station and/or a UE 120) may be enabled to automatically (e.g., without receiving signaling from a network node) switch waveforms or waveform parameters based at least in part on detecting a condition or based at least in part on a rule configured for the UE. The UE may receive an indication of the condition or rule associated with switching between a first waveform (e.g., a UW-OFDM waveform) and a second waveform (e.g., a CP-OFDM waveform) or between a first set of waveform parameters for the first waveform and a second set of waveform parameters for the first waveform. The condition may be based at least in part on one or more network parameters. The UE may communicate (e.g., with a network node), based at least in part on whether the condition is detected (e.g., based at least in part on information or one or more measurement values associated with the one or more network parameters), using the first waveform or the second waveform, or the first set of waveform parameters or the second set of waveform parameters.

As a result, communication performance between the UE and the network node may be improved. For example, the UE may be enabled to switch between waveforms or waveform parameters based on a bandwidth allocation, a channel type, a channel condition, a type of slot or symbol, an SNR measurement, a signal-to-noise-plus-interference ratio (SINK) measurement (SINK may sometimes be referred to as carrier-to-noise-plus-interference ratio (CINR)), and/or one or more waveform constraints, among other examples. Moreover, the UE may be enabled to quickly switch between waveforms and/or waveform parameters based at least in part on detecting a condition (e.g., without waiting for signaling from the network to switch between the waveforms and/or the waveform parameters). Additionally, this may conserve network resources (e.g., radio resources) and/or processing resources, among other examples, that would have otherwise been used to transmit and/or receive signaling indicating that the UE is to switch waveforms and/or waveform parameters. As a result, the UE may be enabled to use an optimal waveform and/or optimal waveform parameters for given network parameters. This may improve a BLER of communications, improve throughput, and/or otherwise improve communication performance of the UE.

In some aspects, the condition may be based at least in part on an operating mode of a network node. For example, an interpretation of the condition may be based at least in part on the operating mode. The operating mode may include an error rate optimizing mode (e.g., a BLER optimizing mode) or a throughput optimizing mode. For example, at least one of the first set of waveform parameters or the second set of waveform parameters may be associated with a first set of information or values for a first operating mode of the network node and a second set of information or values for a second operating mode of the network node. Therefore, based on a parameter that the network is currently optimizing, the UE may use different waveforms or different waveform parameters based at least in part on detecting the condition. This may provide additional flexibility for the network to optimize different parameters (e.g., BLER or throughput) at different times.

As indicated above, FIG. 7 is provided as an example. Other examples may differ from what is described with regard to FIG. 7.

Figure 8:
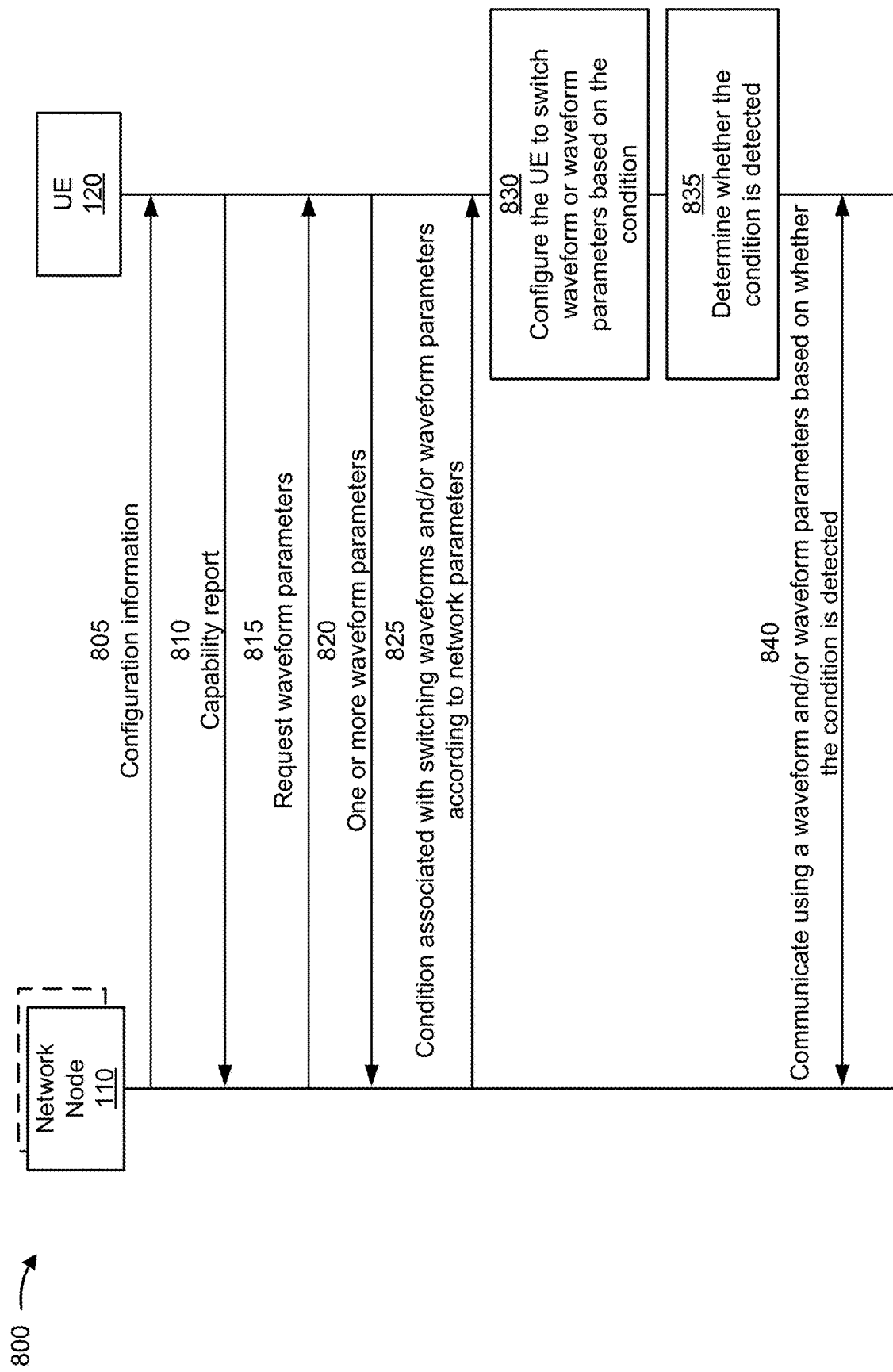
FIGS. 8-11 are diagrams of examples associated with network parameter based waveform parameters, in accordance with the present disclosure.

FIG. 8 is a diagram of an example 800 associated with network parameter based waveform parameters, in accordance with the present disclosure. As shown in FIG. 8, one or more network nodes (e.g., network node 110, a CU, a DU, and/or an RU) may communicate with a UE (e.g., a UE 120). In some aspects, the network node 110 and the UE 120 may be part of a wireless network (e.g., the wireless network 100). The UE 120 and the network node 110 may have established a wireless connection prior to operations shown in FIG. 8.

As used herein, the network node 110 "transmitting" a communication to the UE 120 may refer to a direct transmission (for example, from the network node 110 to the UE 120) or an indirect transmission via one or more other network nodes or devices. For example, if the network node 110 is a DU, an indirect transmission to the UE 120 may include the DU transmitting a communication to an RU and the RU transmitting the communication to the UE 120. Similarly, the UE 120 "transmitting" a communication to the network node 110 may refer to a direct transmission (for example, from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting the communication to the DU.

As shown by reference number 805, the network node 110 may transmit, and the UE 120 may receive, configuration information. In some aspects, the UE 120 may receive the configuration information via one or more of radio resource control (RRC) signaling, one or more medium access control (MAC) control elements (MAC-CEs), and/or downlink control information (DCI), among other examples. In some aspects, the configuration information may include an indication of one or more configuration parameters (e.g., stored by the UE 120 and/or previously indicated by the network node 110 or other network device) for selection by the UE 120, and/or explicit configuration information for the UE 120 to use to configure itself, among other examples.

In some aspects, the configuration information may indicate that the UE 120 is to switch between a first waveform (e.g., a UW-OFDM waveform) and a second waveform (e.g., a CP-OFDM waveform) or between a first set of waveform parameters for the first waveform and a second set of waveform parameters for the first waveform based at least in part on detecting a condition or based at least in part on one or more rules. For example, the configuration information may indicate that the first waveform (e.g., the UW-OFDM waveform) and the second waveform (e.g., the CP-OFDM waveform) are configured for use by the UE 120 (e.g., for transmitting and/or receiving communications). For example, the configuration information may indicate that the UE 120 is to switch to a set of optimal waveform parameters based at least in part on one or more signaled network parameters. The network parameters may also be referred to as system parameters (e.g., wireless communication system parameters).

The one or more network parameters may include a bandwidth allocation (e.g., a total quantity of RBs allocated for a communication), a channel type (e.g., an additive white Gaussian noise (AWGN) channel model, or a clustered delay line (CDL) channel model, among other examples), a channel condition, a type of slot or symbol (e.g., associated with a reference signal, such as a DMRS, a phase tracking reference signal (PTRS), or a channel station information (CSI) reference signal (CSI-RS), among other examples), a transmission direction (e.g., uplink vs. downlink) associated with a slot or symbol, a physical channel associated with a slot or a symbol (e.g., a physical uplink shared channel (PUSCH) or a physical downlink shared channel (PDSCH)), an SNR measurement, an SINR measurement, and/or one or more waveform constraints (e.g., allowed deviation in a power of GI samples, allowed quantities of redundant subcarriers, among other examples), among other examples. The configuration information may indicate the network parameters to be considered by the UE 120 (e.g., for detecting the condition associated with switching waveforms or waveform parameters). Additionally, or alternatively, the configuration information may indicate values or information for one or more of the network parameters.

The waveform parameters may include a quantity of redundant subcarriers, a modulation and coding scheme, a code rate, a transport block size, and/or an indication of a technique to be used to generate or place the redundant subcarriers within a bandwidth allocation (e.g., a process or algorithm to be used by a transmitter (e.g., the UE 120 or the network node 110) to generate or map the redundant subcarriers within a bandwidth allocation), among other examples. In some aspects, the configuration information may indicate the waveform parameters to be switched to when certain network parameters are present or detected (e.g., when the condition is detected or a rule is satisfied).

In some aspects, the configuration information may indicate that the UE 120 is to transmit an indication of a set of optimal waveform parameters (e.g., that are based at least in part on information stored by the UE 120 or measurements performed by the UE 120). In some other aspects, the network node 110 may determine the set of optimal waveform parameters (e.g., that are to be used when the condition is detected or a rule is satisfied). In some aspects, the configuration information may indicate that a set of optimal waveform parameters (e.g., the first set of waveform parameters or the second set of waveform parameters) are to be used by the UE 120 for communications with the network node 110. For example, the UE 120 may be configured (e.g., for a UW-OFDM waveform) to switch between using a first quantity of redundant subcarriers or a second quantity of redundant subcarriers based at least in part on the one or more network parameters. Additionally, or alternatively, the UE 120 may be configured (e.g., for a given waveform) to switch between using a first MCS or a second MCS based at least in part on the one or more network parameters. Additionally, or alternatively, the UE 120 may be configured (e.g., for a given waveform) to switch between using a first MCS or a second MCS based at least in part on the one or more network parameters a first code rate and a second code rate based at least in part on the one or more network parameters. The determination as to whether to use a first set of waveform parameters or a second set of waveform parameters may be based at least in part on whether a condition is met or a measurement satisfies a threshold, as described in more detail elsewhere herein.

In some aspects, the configuration information may indicate that the network node 110 is associated with one or more operating modes. The operating modes may be associated with optimizing one or more parameters of communications associated with the network node, such as BLER or throughput, among other examples. For example, the configuration information may indicate that the network node 110 is associated with a BLER optimizing mode and a throughput optimizing mode. "BLER optimizing mode" may refer to a mode of operation in which a goal of the network node 110 is to optimize a BLER of communications in the wireless network 100. "Throughput optimizing mode" may refer to a mode of operation in which a goal of the network node 110 is to optimize a throughput of communications in the wireless network 100.

In some aspects, the configuration information may indicate that the UE 120 is to use different sets of optimal waveform parameters based at least in part on a current operating mode of the network node 110 (e.g., to use a first set of optimal waveform parameters when the network node is operating in a first operating mode and the condition is detected, and to use a second set of optimal waveform parameters when the network node is operating in a second operating mode and the condition is detected). For example, the configuration information may indicate that the UE 120 is to use a first set of optimal waveform parameters if the network node 110 is operating in a BLER optimizing mode, and a second set of optimal waveform parameters if the network node 110 is operation in a throughput optimizing mode (e.g., when the condition is detected or a rule is satisfied).

The condition or rule associated with switching between waveforms or waveform parameters may be associated with one or more thresholds (e.g., a GI degradation threshold, an SNR threshold, an SINR threshold, or another threshold). For example, if the UE detects that information or measurements satisfy the one or more thresholds, the UE may communicate using the first waveform and/or the first set of waveform parameters. If the UE detects that the information or the measurements do not satisfy the one or more thresholds, then the UE may communicate using a second waveform and/or the second set of waveform parameters. In some aspects, the condition or rule may be associated with one or more network parameters. In some aspects, the one or more network parameters may be associated with respective thresholds. For example, the condition or rule may be associated with a first network parameter (e.g., that is associated with a first threshold), a second network parameter (e.g., that is associated with a second threshold), a third network parameter (e.g., that is associated with a third threshold), and so on.

For example, the condition or rule may be associated with an allowed GI degradation associated with the UW-OFDM waveform. For example, the configuration information (or other signaling received by the UE 120 as described herein) may indicate an allowed GI degradation (e.g., a maximum allowed GI degradation or a GI degradation threshold) associated with the UW-OFDM waveform (e.g., the allowed GI degradation may be 3 decibels or another value). For example, the allowed GI degradation may be a threshold, as described above. If measured (e.g., by the UE 120) GI degradation is less than or equal to the allowed GI degradation, then the UE 120 may communicate using the first waveform and/or the first set of waveform parameters. If the measured (e.g., by the UE 120) GI degradation is greater than the allowed GI degradation, then the UE 120 may communicate using the second waveform and/or the second set of waveform parameters. As another example, the condition or rule may be associated with SNR measurements and/or SINR measurements. The condition or rule may be associated with an SNR threshold or an SINR threshold. For example, if a measured SNR (e.g., by the UE 120 using a downlink channel) satisfies the SNR threshold, then the UE 120 may communicate using the first waveform and/or the first set of waveform parameters. If the measured SNR (e.g., by the UE 120 using a downlink channel) does not satisfy the SNR threshold, then the UE 120 may communicate using the second waveform and/or the second set of waveform parameters.

Additionally, or alternatively, the condition or rule associated with switching between waveforms or waveform parameters may be associated with information associated with certain network parameters. For example, if the UE is communicating using a channel associated with a first channel model or a first physical channel, switching between waveforms or waveform parameters may be associated with a first one or more conditions or rules (e.g., that are associated with one or more thresholds, as described above). If the UE is communicating using a channel associated with a second channel model or a second physical channel, switching between waveforms or waveform parameters may be associated with a second one or more conditions or rules (e.g., that are associated with one or more thresholds, as described above). In other words, in some examples, the information associated with the network parameters (e.g., a bandwidth allocation, a channel type, a channel condition, a physical channel, among other examples) may be used to select or determine the condition(s) to be used, as described elsewhere herein.

In some aspects, as shown by reference number 810, the UE 120 may transmit, and the network node 110 may receive, a capability report. In some aspects, the configuration information may be based at least in part on the capability report. In other words, in some cases, the UE 120 may receive the configuration information (or part of the configuration information) after transmitting the capability report. For example, the configuration information may configure the UE 120 to perform operations that are supported by the UE 120, as indicated by the capability report.

In some aspects, the capability report may indicate UE support for switching waveforms or waveform parameters in accordance with the present disclosure. For example, the capability report may indicate that the UE 120 supports switching waveforms or waveform parameters based at least in part on detecting a condition or a rule being satisfied (e.g., based at least in part on one or more network parameters, as described in more detail elsewhere herein). In some aspects, the capability report may indicate UE support for the first waveform and the second waveform. For example, the capability report may indicate UE support for the UW-OFDM waveform and the CP-OFDM waveform. In some aspects, the capability report may indicate UE support for one or more waveform parameters or values associated with one or more waveform parameters. For example, the capability report may indicate UE support for a minimum or maximum quantity of redundant subcarriers supported by the UE 120, and/or one or more supported processes or algorithms for generating or mapping redundant subcarriers, among other examples.

The UE 120 may configure itself based at least in part on the configuration information. In some aspects, the UE 120 may be configured to perform one or more operations described herein based at least in part on the configuration information.

In some aspects, as shown by reference number 815, the network node 110 may transmit, and the UE 120 may receive, a request for waveform parameters associated with the first waveform and/or the second waveform. For example, the network node 110 may request that the UE 120 provide preferred or optimal waveform parameters associated with the first waveform and/or the second waveform. The UE 120 may determine the preferred or optimal waveform parameters based at least in part on information stored by the UE 120 (e.g., a stored configuration or an original equipment manufacturer (OEM) configuration) and/or based at least in part on one or more measurements performed by the UE 120.

For example, the UE 120 may measure one or more network parameters or channel conditions. The UE 120 may determine the preferred or optimal waveform parameters based at least in part on the measurements of the one or more network parameters or channel conditions. For example, the UE 120 may measure a GI quality of the UW-OFDM waveform and may determine the preferred or optimal waveform parameters based at least in part on the GI quality. As another example, the UE 120 may determine an error rate (e.g., a BLER) associated with communications transmitted or received by the UE 120. The UE 120 may determine the preferred or optimal waveform parameters based at least in part on the error rate (e.g., the BLER). As another example, the UE 120 may measure an SNR and/or an SINR associated with a channel. The UE 120 may determine the preferred or optimal waveform parameters based at least in part on the measured SNR and/or SINR.

As shown by reference number 820, the UE 120 may transmit, and the network node 110 may receive, an indication of one or more waveform parameters. In some aspects, the UE 120 may transmit the indication of the one or waveform parameters based at least in part on the UE 120 receiving the request for waveform parameters. For example, the UE 120 may transmit, and the network node 110 may receive, an indication of at least one of the first set of waveform parameters or the second set of waveform parameters (e.g., that are to be switched between by the UE 120 and/or the network node 110 based at least in part on whether the condition is detected or a rule is satisfied, as described in more detail elsewhere herein) based at least in part on the UE receiving, and the network node 110 transmitting, the request. In other words, the UE 120 may transmit an indication of the preferred or optimal waveform parameters (e.g., that are determined by the UE 120).

In some other aspects, the UE 120 may transmit the indication of the one or waveform parameters based at least in part on performing one or more measurements of one or more channel parameters, such as SNR, SINR, RSRP, and/or RSRQ, among other examples. For example, the UE 120 may perform one or more measurements of the one or more channel parameters. The UE 120 may transmit, and the network node 110 may receive, an indication of at least one of the first set of waveform parameters or the second set of waveform parameters (e.g., that are to be switched between by the UE 120 and/or the network node 110 based at least in part on whether the condition is detected or a rule is satisfied). The first set of waveform parameters or the second set of waveform parameters may be selected by the UE 120 based at least in part on the one or more measurements of the one or more channel parameters.

For example, the UE 120 may measure a current operating SNR or SINR on a link or channel being used by the UE 120. The UE 120 may determine the preferred or optimal waveform parameters (e.g., a quantity of redundant subcarriers, a quantity of data subcarriers, an MCS, a code rate, and/or a TB size, among other examples) based at least in part on the current operating conditions of the UE 120 (e.g., based at least in part on the measured SNR and/or SINR). The UE 120 may transmit, and the network node may receive, an indication of the preferred or optimal waveform parameters as determined by the UE 120 based at least in part on the current operating conditions of the UE 120. In other words, the UE 120 may transmit a request to the network node 110 that the preferred or optimal waveform parameters (e.g., as determined by the UE 120 based at least in part on the current operating conditions of the UE 120) be used for communications associated with the UE 120.

In some aspects, the UE 120 may perform the SNR and/or SINR measurements using one or more channel measurement resources that are configured for the UE 120. The one or more channel measurement resources may include CSI-RS resources, among other examples. For example, the network node 110 may transmit a configuration of the one or more channel measurement resources. The network node 110 may configure the one or more channel measurement resources for the purpose of performing measurements to obtain information associated with switching waveforms or waveform parameters. For example, the network node 110 may configure SNR and/or SINR measurement resources for the UE 120 to measure (e.g., and reporting resources for the UE to report the measurement values) so that network node 110 (or another network node) may use the measurement values to determine the condition(s) for switching and/or the preferred or optimal set of waveform parameters. The UE 120 may receive, and the network node may transmit, an indication of the one or more measurement resources associated with switching waveforms or waveform parameters. The UE 120 may transmit (e.g., using reporting resources configured for the UE 120), and the network node 110 may receive, an indication of the one or more SNR measurements or the one or more SINR measurements that are performed using the one or more measurement resources. In this way, the network (e.g., the network node 110 or another network node) may be enabled to obtain current operating conditions (e.g., current SNR or SINR conditions) of the UE 120 for improved determinations associated with the condition(s) for switching and/or the preferred or optimal set of waveform parameters.

In some aspects, the network node 110 may transmit, and the UE 120 may receive, an indication of an operating mode associated with the network node 110 (or with another network node, such as a DU or a CU, that is associated with the network node 110). For example, as described in more detail elsewhere herein, the network node 110 may operate in different operating modes, such as a BLER optimizing mode or a throughput optimizing mode, among other examples. In some aspects, the condition may change based at least in part on a current operating mode associated with the network node 110. For example, a first one or more conditions may be associated with a BLER optimizing mode and a second one or more conditions may be associated with a throughput optimizing mode. Additionally, or alternatively, the determined optimal set of waveform parameters (e.g., determined by the UE 120 or the network node 110) may change based at least in part on a current operating mode associated with the network node 110. For example, pre-agreed optimal waveform parameters for optimizing BLER may be different than waveform parameters for optimizing throughput.

Figure 9:
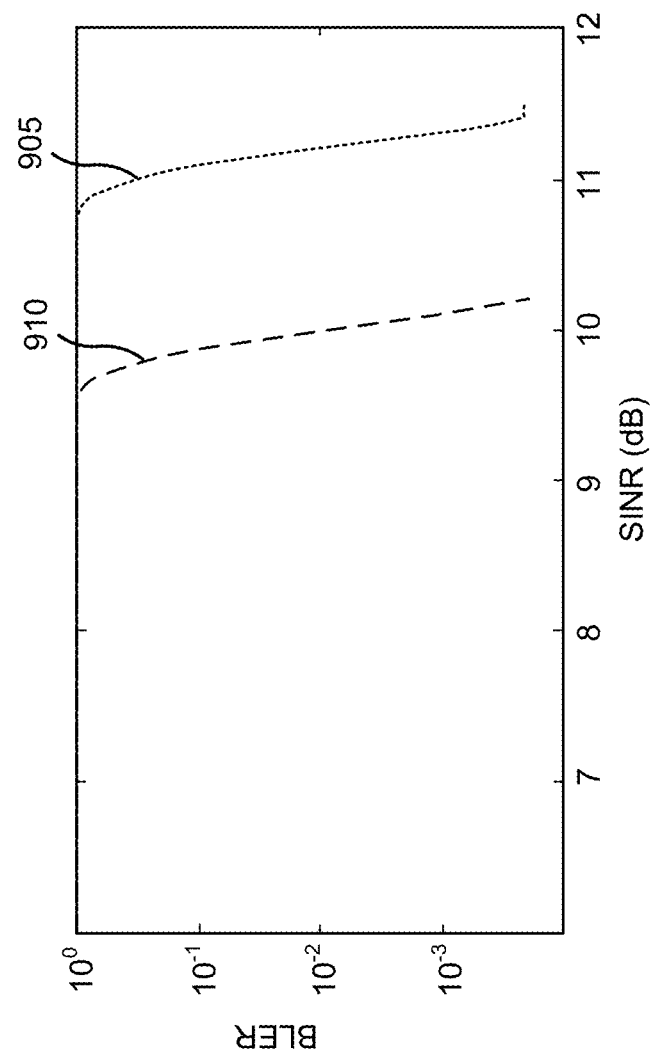

For example, if the UE 120 receives an indication that the network node 110 is operating in a BLER optimizing mode, then the UE 120 may determine (e.g., as described in more detail elsewhere herein, such as in connection with FIG. 9) a set of preferred or optimal waveform parameters for optimizing a BLER associated with communications (e.g., by determining waveform parameters that balance between ISI and BLER by reducing the quantity of redundant subcarriers). As another example, if the UE 120 receives an indication that the network node 110 is operating in a throughput optimizing mode, then the UE 120 may determine (e.g., as described in more detail elsewhere herein) a set of preferred or optimal waveform parameters for optimizing a throughput associated with communications. For example, the UE 120 may determine a waveform and/or waveform parameters to be used by the UE 120 and/or the network node 110 based at least in part on current SNR or SINR conditions (e.g., as depicted in more detail in FIG. 11).

Additionally, or alternatively, the network node 110 may determine at least one of the first set of waveform parameters or the second set of waveform parameters (e.g., that are to be switched between by the UE 120 and/or the network node 110 based at least in part on whether the condition is detected or a rule is satisfied, as described in more detail elsewhere herein). For example, the network node 110 may determine the preferred or optimal waveform parameters for the first waveform and/or the second waveform. In some aspects, the network node 110 may determine the preferred or optimal waveform parameters based at least in part on one or more measurements (e.g., in a similar manner as described above in connection with the UE 120 determining the preferred or optimal waveform parameters). For example, the network node 110 may perform measurements associated with an uplink channel. The network node 110 may infer the preferred or optimal waveform parameters based at least in part on reciprocity of the channel.

In some aspects, the network node 110 (e.g., if the network node 110 is a base station, a CU, or a DU) may determine the one or more conditions or the one or more rules associated with switching between waveforms or waveform parameters, as described herein. For example, the network node 110 may determine one or more thresholds to be associated with the condition or rule associated with switching between waveforms or waveform parameters, as described in more detail elsewhere herein.

As shown by reference number 825, the network node 110 may transmit, and the UE 120 may receive, an indication of a condition associated with switching between the first waveform and the second waveform or between a first set of waveform parameters for the first waveform and a second set of waveform parameters for the first waveform. For example, the UE 120 may receive an indication that if the condition detected (e.g., by the UE 120), then the UE 120 is to use the first waveform and/or the first set of waveform parameters. The UE 120 may receive an indication that if the condition is not detected (e.g., by the UE 120), then the UE 120 is to use the second waveform and/or the second set of waveform parameters. As described elsewhere herein, the condition may be associated with one or more thresholds and/or one or more rules. For example, the condition may be based at least in part on one or more network parameters or channel conditions, as described in more detail elsewhere herein.

As described above, the indication of the condition may be included in the configuration information. For example, the network node 110 may transmit, and the UE 120 may receive, an RRC communication that includes the indication of the condition. In other words, the UE 120 may be configured with the condition for switching waveforms or waveform parameters at an RRC layer. As another example, the network node 110 may transmit, and the UE 120 may receive, a semi-static communication that includes the condition. For example, the network node 110 may transmit, and the UE 120 may receive, a MAC-CE communication that includes the indication of the condition. In other words, the UE 120 may be configured with the condition for switching waveforms or waveform parameters at a PHY layer or a MAC layer, among other examples (e.g., via a MAC-CE communication).

As another example, the UE 120 may receive a dynamic communication that includes the indication of the condition. For example, the network node 110 may dynamically indicate and/or change the condition for switching waveforms or waveform parameters. For example, the network node 110 may transmit, and the UE 120 may receive, a downlink control information communication that includes the indication of the condition. For example, the network node 110 may indicate a condition or rule for switching waveforms or waveform parameters for each resource allocation granted by the network node 110 (e.g., per allocation) via DCI that indicates the resource allocation. For example, the UE 120 may receive downlink control information that includes the indication of the condition. The UE 120 may communicate (e.g., transmit or receive) a signal that is scheduled by the downlink control information. For example, the UE 120 may determine a waveform and/or waveforms to be used for the signal based at least in part on the condition indicated by the downlink control information, as described in more detail elsewhere herein.

In some aspects, the indication of the condition may include an indication of the first set of waveform parameters and/or the second set of waveform parameters. For example, the indication of the condition may include an indication of optimized waveform parameters that are to be switched to (e.g., by the UE 120 and/or the network node 110) if the condition is detected. For example, the indication of the condition may include an indication of a bandwidth allocation (e.g., a quantity of RBs), a quantity of redundant subcarriers, a quantity of data subcarriers, an MCS, a code rate, a TB size, and/or an indication of a technique to be used to generate or place the redundant subcarriers within a bandwidth allocation (e.g., a process or algorithm to be used by a transmitter to generate or map the redundant subcarriers within the bandwidth allocation), among other examples.

As shown by reference number 830, the UE 120 may configure itself based at least in part on the condition(s) or rule(s) for switching waveforms and/or waveform parameters. For example, the UE 120 may be configured to switch waveforms and/or waveform parameters based at least in part on the condition(s) or rule(s) (e.g., as indicated by the network node 110). In other words, the UE 120 may store information associated with the condition(s) or rule(s) and may monitor network parameters and/or channel conditions to determine whether a condition is detected or a rule is satisfied, as described in more detail elsewhere herein.

As shown by reference number 835, the UE 120 may determine whether the condition is detected. In some aspects, the UE 120 may determine whether the condition is detected based at least in part on information received from the network node 110. For example, the UE 120 may receive, and the network node 110 may transmit, an indication of information or one or more measurement values associated with the one or more network parameters. For example, the network node 110 may indicate a total bandwidth allocation (e.g., a quantity of RBs included in the bandwidth), a channel type (e.g., AWGN or CDL, among other examples), a physical channel associated with a slot or symbol (e.g., associated with a reference signal, such as DMRS/PTRS/CSI-RS or associated with the PDSCH or PUSCH), one or more measurement values (e.g., SNR and/or SINR measurements performed by the network node 110), and/or other waveform constraints (e.g., an allowed deviation in GI samples, or allowed quantities of redundant subcarriers), among other examples. The UE 120 may determine whether the condition is detected or a rule is satisfied based at least in part on the information signaled to the UE 120.

Additionally, or alternatively, the UE 120 may determine whether the condition is detected or a rule is satisfied based at least in part on information stored by the UE 120. For example, the UE 120 may perform one or more measurements, such as SNR and/or SINR measurements. The UE 120 may store the measurement values associated with the SNR and/or SINR measurements. The UE 120 may determine whether the condition is detected or a rule is satisfied based at least in part on the measurement values associated with the SNR and/or SINR measurements (e.g., that are performed by the UE 120). In other words, the UE 120 may determine whether the condition is detected or a rule is satisfied based at least in part on information signaled to the UE 120 and/or information stored by the UE 120.

For example, the UE 120 may determine whether a GI degradation (e.g., in units of decibels) satisfies a GI degradation threshold associated with the condition or rule. If the GI degradation satisfies the GI degradation threshold, then the UE 120 may determine that a first waveform (e.g., the UW-OFDM waveform) and/or a first set of waveform parameters is to be used by the UE 120. If the GI degradation does not satisfy the GI degradation threshold, then the UE 120 may determine that a second waveform (e.g., the CP-OFDM waveform) and/or a second set of waveform parameters is to be used by the UE 120. As another example, the UE 120 may determine whether an SNR measurement satisfies an SNR threshold associated with the condition or rule. If the SNR measurement satisfies the SNR threshold, then the UE 120 may determine that a first waveform (e.g., the UW-OFDM waveform) and/or a first set of waveform parameters is to be used by the UE 120. If the SNR measurement does not satisfy the SNR threshold, then the UE 120 may determine that a second waveform (e.g., the CP-OFDM waveform) and/or a second set of waveform parameters is to be used by the UE 120. The UE 120 may determine whether other conditions are detected or rules are satisfied in a similar manner (e.g., using other network parameters, as described in more detail elsewhere herein). The network node 110 may determine whether the condition is detected and/or a rule is satisfied in a similar manner as described above.

As shown by reference number 840, the UE 120 may communicate with the network node 110 using the first waveform (e.g., the UW-OFDM waveform) or the second waveform (e.g., the CP-OFDM waveform), and/or using a first set of waveform parameters or a second set of waveform parameters based at least in part on whether the condition is detected. For example, the UE 120 may receive, and the network node 110 may transmit, a communication using the UW-OFDM waveform or the CP-OFDM waveform and/or using a first set of waveform parameters or a second set of waveform parameters based at least in part on whether the condition is detected. As another example, the UE 120 may transmit, and the network node 110 may receive, a communication using the UW-OFDM waveform or the CP-OFDM waveform and/or using a first set of waveform parameters or a second set of waveform parameters based at least in part on whether the condition is detected.

For example, if the condition is detected (e.g., by the UE 120 and/or the network node 110), a communication (e.g., an uplink communication or a downlink communication) between the UE 120 and the network node 110 may use the first waveform (e.g., the UW-OFDM waveform) and/or the first set of waveform parameters. If the condition is not detected (e.g., by the UE 120 and/or the network node 110), a communication (e.g., an uplink communication or a downlink communication) between the UE 120 and the network node 110 may use the second waveform (e.g., the CP-OFDM waveform) or the second set of waveform parameters.

As a result, the UE 120 may be enabled to determine a waveform and/or waveform parameters to be used from communications "on-the-fly" without additional signaling from the network node 110. This may reduce an amount of time associated with the UE 120 switching to an optimal waveform and/or a set of optimal waveform parameters (e.g., based at least in part on current network parameters or channel conditions). Additionally, this may conserve network resources (e.g., radio resources) and/or processing resources, among other examples, that would have otherwise been used associated with signaling to cause the UE 120 to switch to an optimal waveform and/or a set of optimal waveform parameters (e.g., based at least in part on current network parameters or channel conditions). As a result, communication performance between the UE and the network node may be improved. For example, using an optimal waveform and/or a set of optimal waveform parameters may increase throughput and/or decrease BLER associated with communications between the UE 120 and the network node 110.

As indicated above, FIG. 8 is provided as an example. Other examples may differ from what is described with respect to FIG. 8.

FIG. 9 is a diagram of an example 900 associated with network parameter based waveform parameters, in accordance with the present disclosure. As shown in FIG. 9, reducing a quantity of redundant subcarriers associated with a signal using a UW-OFDM waveform may reduce a BLER associated with the signal.

For example, FIG. 9 shows a graph indicating BLER values on the vertical axis of the graph and SINR values on the horizontal axis of the graph. A waveform 905 and a waveform 910 may be associated with the same waveform parameters except a quantity of redundant subcarriers. The waveform 905 and the waveform 910 may be communicated via the same channel and/or under the same channel conditions. For example, the waveform 905 and the waveform 910 may be associated with the UW-OFDM waveform and a bandwidth allocation of 266 RBs. The waveform 905 and the waveform 910 may be associated with the same quantity of data subcarriers (e.g., 247). However, the waveform 905 may be associated with a first quantity of redundant subcarriers (e.g., 18) and the waveform 910 may be associated with a second quantity of redundant subcarriers (e.g., 8).

As shown in FIG. 9, at a same operating SINR value, the waveform 910 may be associated with a lower BLER value than the waveform 905. Therefore, as shown, reducing the quantity of redundant subcarriers may reduce a BLER associated with a signal. Therefore, as described in more detail elsewhere herein, waveform parameters associated with the UW-OFDM waveform may be optimized to reduce BLER. However, as described elsewhere herein, reducing the quantity of redundant subcarriers associated with a UW-OFDM signal may cause ISI to increase at a certain point (e.g., due to a degradation of the GI). Therefore, a UE 120 and/or network node 110 may determine a set of optimal waveform parameters to balance reducing a BLER associated with UW-OFDM signals while not increasing the ISI to a point that the ISI increases the BLER. For example, the information depicted in FIG. 9 may be used by a UE 120 and/or a network node 110 to determine an optimal waveform and/or an optimal set of waveform parameters when the network (e.g., a network node 110) is operating in a BLER optimizing mode. As an example, at a given SINR, the quantity of redundant subcarriers may be selected such that the BLER is less than or equal to a BLER threshold and the ISI is less than or equal to an ISI threshold.

As indicated above, FIG. 9 is provided as an example. Other examples may differ from what is described with respect to FIG. 9.

Figure 10:
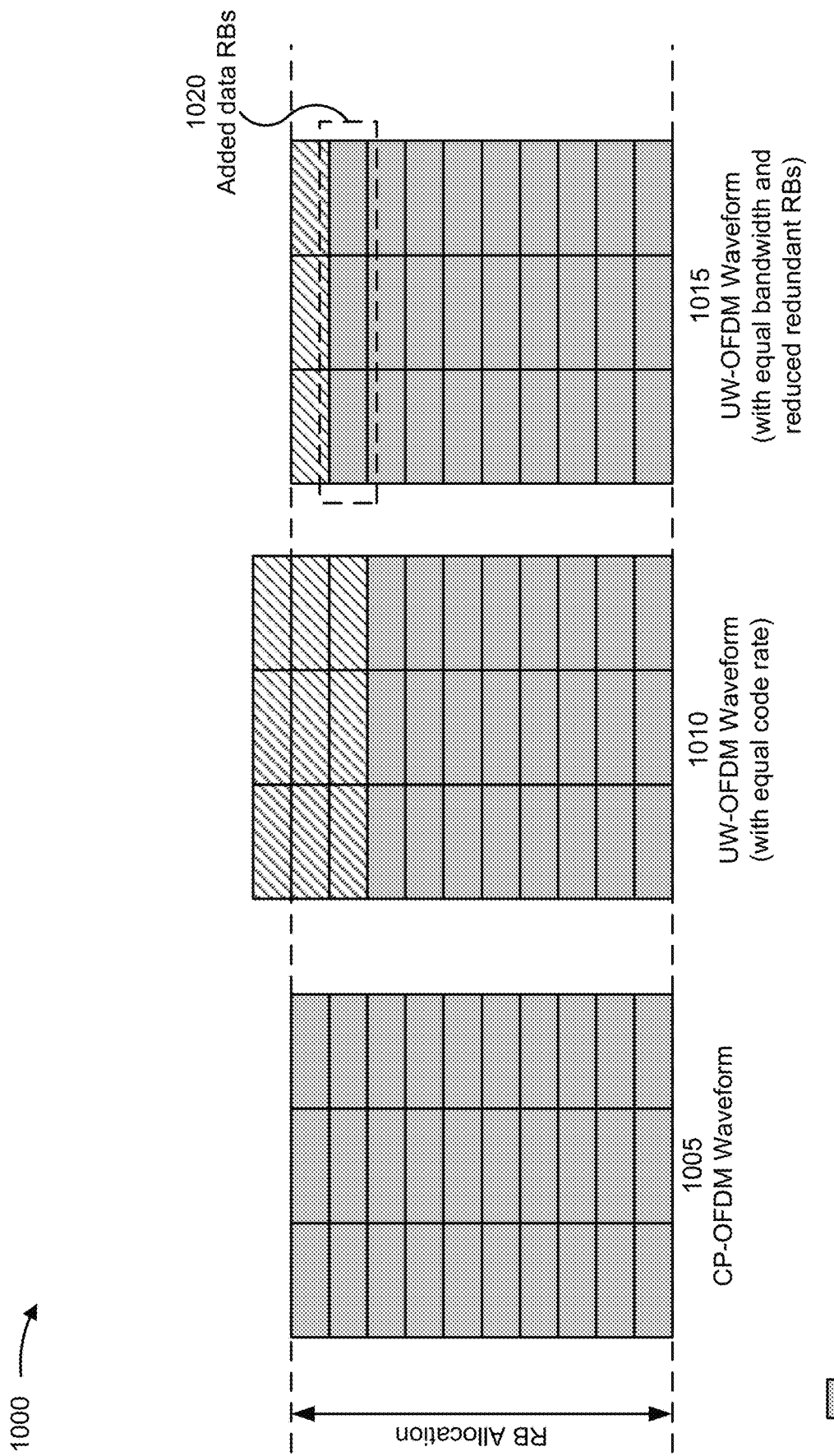

FIG. 10 is a diagram of an example 1000 associated with network parameter based waveform parameters, in accordance with the present disclosure. FIG. 10 depicts an example associated with increasing throughput associated with a signal using the UW-OFDM waveform by reducing the quantity of redundant subcarriers associated with the UW-OFDM waveform.

For example, throughput associated with signals using a CP-OFDM waveform may typically be higher than signals using a UW-OFDM waveform (e.g., because the CP-OFDM waveform may not include redundant subcarriers or RBs), as shown in FIG. 10. Therefore, an entire RB allocation for a bandwidth may be associated with data RBs for a signal using a CP-OFDM waveform 1005. To result in the same code rate, a signal using a UW-OFDM waveform 1010 may occupy a greater bandwidth than the signal using the CP-OFDM waveform 1005 (e.g., resulting in a lower throughput for the signal using the UW-OFDM waveform). For example, as shown in FIG. 10, the signal associated with the same code rate as the CP-OFDM signal may occupy a larger bandwidth due to the additional redundant sub carriers or RBs.

However, if the quantity of redundant subcarriers for the RB allocation is reduced, then after a certain point, the UW-OFDM waveform may use less RBs than the CP-OFDM waveform (e.g., to achieve the same code rate). Therefore, under certain operating conditions (e.g., certain SNR conditions), a quantity of redundant subcarriers of the UW-OFDM waveform may be reduced such that a quantity of data subcarriers associated with the UW-OFDM waveform may be increased for the same total bandwidth (e.g., the same total quantity of RBs).

For example, as shown in FIG. 10, a signal using the UW-OFDM waveform 1015 may be associated with the same bandwidth as the signal associated with the CP-OFDM waveform 1005. However, by reducing the quantity of redundant subcarriers or RBs associated with the signal (e.g., as compared to a UW-OFDM waveform 1010 that achieved the same code rate as the CP-OFDM waveform 1005), additional data RBs 1020 may be included in the UW-OFDM waveform 1015. Therefore, the UW-OFDM waveform 1015 may be associated with a higher code rate and/or peak throughput than the CP-OFDM waveform 1005.

This may result in an increased TB size, increased code rate, and/or an increased peak throughput for the signal using the UW-OFDM waveform 1015. However, at some operating conditions (e.g., other SNR conditions), the quantity of redundant subcarriers of the UW-OFDM waveform 1015 (e.g., that enabled the increased quantity of data subcarriers) may result in a reduced throughput as compared to the CP-OFDM waveform 1005 (e.g., due to a degraded GI and/or increased ISI). For example, reducing the quantity of the redundant subcarriers may degrade the quality of the GI, thereby increasing ISI. Therefore, as shown in FIG. 11, there may be certain SNR values at which it may be beneficial to switch waveforms and/or waveform parameters, as described in more detail elsewhere herein.

As indicated above, FIG. 10 is provided as an example. Other examples may differ from what is described with respect to FIG. 10.

Figure 11:
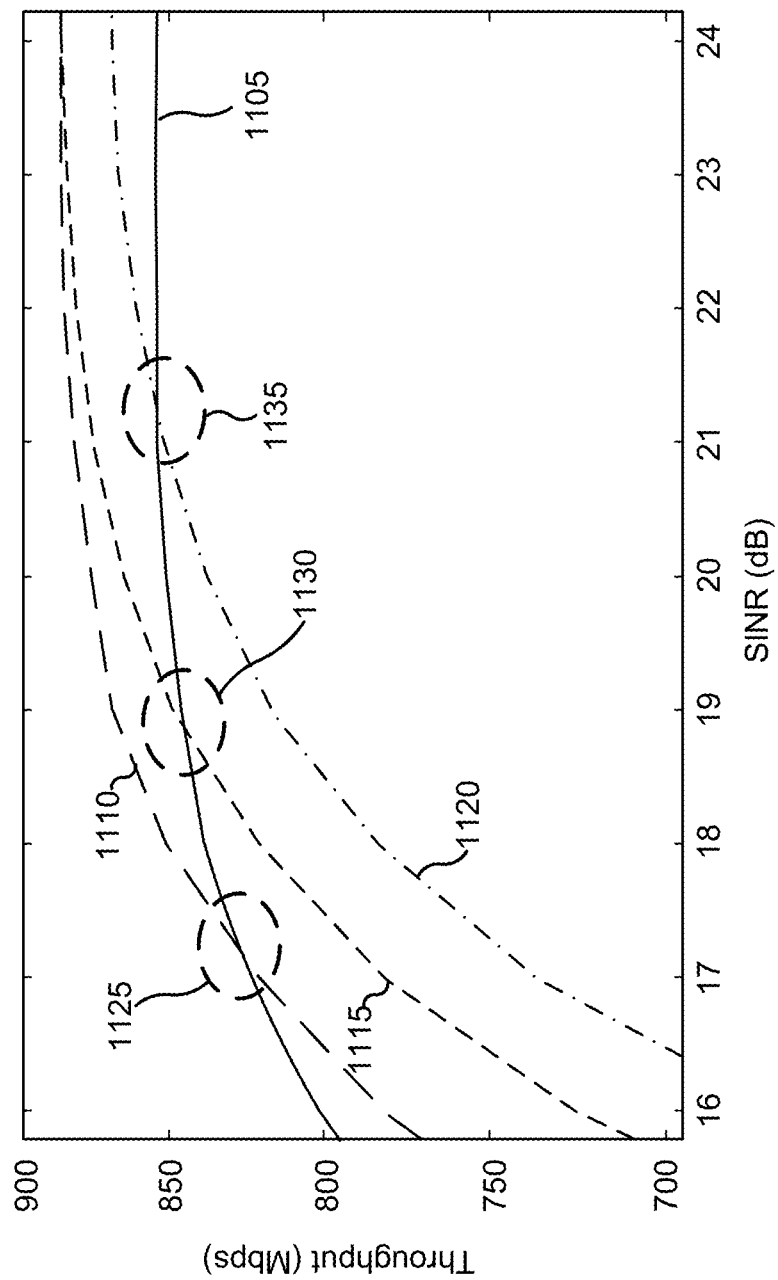

FIG. 11 is a diagram of an example 1100 associated with network parameter based waveform parameters, in accordance with the present disclosure. As shown in FIG. 9, reducing a quantity of redundant subcarriers associated with a signal using a UW-OFDM waveform may increase a throughput associated with the signal at certain operating SINR or SNR values.

For example, FIG. 11 shows a graph indicating throughput values (e.g., in units of megabits per second) on the vertical axis of the graph and SINR values on the horizontal axis of the graph. The waveforms depicted in the graph may be associated with the same RB allocation (e.g., the same total bandwidth allocation) and/or the same channel model or channel conditions. As shown in FIG. 11, a CP-OFDM waveform 1105 (e.g., that uses the CP-OFDM waveform), a first UW-OFDM waveform 1110 (e.g., that uses the UW-OFDM waveform a first set of waveform parameters), a second UW-OFDM waveform 1115 (e.g., that uses the UW-OFDM waveform a second set of waveform parameters), and a third UW-OFDM waveform 1120 (e.g., that uses the UW-OFDM waveform a third set of waveform parameters) are shown. The first UW-OFDM waveform 1110 may be associated with a first quantity of data RBs (e.g., 258) and a first quantity of redundant RBs or subcarriers (e.g., 8). The second UW-OFDM waveform 1115 may be associated with a second quantity of data RBs (e.g., 254) and a first quantity of redundant RBs or subcarriers (e.g., 12). The third UW-OFDM waveform 1120 may be associated with a second quantity of data RBs (e.g., 252) and a first quantity of redundant RBs or subcarriers (e.g., 14).

As shown in FIG. 11, at SINR values less than a first SINR value 1125, the CP-OFDM waveform 1105 may be associated with a greater throughput than the first UW-OFDM waveform 1110, the second UW-OFDM waveform 1115, and the third UW-OFDM waveform 1120. However, at SINR values greater than the first SINR value 1125, the first UW-OFDM waveform 1110 may be associated with a greater throughput than the CP-OFDM waveform 1105. At SINR values less than a second SINR value 1130, the CP-OFDM waveform 1105 may be associated with a greater throughput than the second UW-OFDM waveform 1115 and the third UW-OFDM waveform 1120. However, at SINR values greater than the second SINR value 1130, the second UW-OFDM waveform 1115 may be associated with a greater throughput than the CP-OFDM waveform 1105. At SINR values less than a third SINR value 1135, the CP-OFDM waveform 1105 may be associated with a greater throughput than the third UW-OFDM waveform 1120. However, at SINR values greater than the third SINR value 1135, the third UW-OFDM waveform 1120 may be associated with a greater throughput than the CP-OFDM waveform 1105.

As described in more detail elsewhere herein, a condition or rule associated with switching waveforms and/or waveform parameters may be associated with one or more SINR thresholds. A value associated with an SINR threshold may be determined based at least in part on an SINR value at which the throughput of a first waveform switches from being greater than to being less than a throughput of a second waveform. For example, an SINR threshold associated with switching between the CP-OFDM waveform 1105 and the first UW-OFDM waveform 1110 may be the first SINR value 1125. For example, if a current operating SINR is less than or equal to the first SINR value 1125, then a UE may operate using the CP-OFDM waveform 1105. If the current operating SINR is greater than the first SINR value 1125, then the UE may operate using the first UW-OFDM waveform 1110. As another example, an SINR threshold associated with switching between the CP-OFDM waveform 1105 and the second UW-OFDM waveform 1115 may be the second SINR value 1130. For example, if a current operating SINR is less than or equal to the second SINR value 1130, then a UE may operate using the CP-OFDM waveform 1105. If the current operating SINR is greater than the second SINR value 1130, then the UE may operate using the second UW-OFDM waveform 1115. As another example, an SINR threshold associated with switching between the CP-OFDM waveform 1105 and the third UW-OFDM waveform 1120 may be the third SINR value 1135. For example, if a current operating SINR is less than or equal to the third SINR value 1135, then a UE may operate using the CP-OFDM waveform 1105. If the current operating SINR is greater than the third SINR value 1135, then the UE may operate using the third UW-OFDM waveform 1120. In some aspects, the information depicted in FIG. 11 may be used by a UE 120 and/or a network node 110 to determine an optimal waveform and/or an optimal set of waveform parameters when the network (e.g., a network node 110) is operating in a throughput optimizing mode.

The network (e.g., a network node 110) may determine an optimal UW-OFDM waveform (e.g., from the first UW-OFDM waveform 1110, the second UW-OFDM waveform 1115, and the third UW-OFDM waveform 1120) based on current system parameters (e.g., in a similar manner as described elsewhere herein). A UE 120 may be configured with an SINR threshold value (e.g., from the first SINR value 1125, the second SINR value 1130, and the third SINR value 1135) based on the optimal UW-OFDM waveform determined by the network.

As indicated above, FIG. 11 is provided as an example. Other examples may differ from what is described with respect to FIG. 11.

Figure 12:
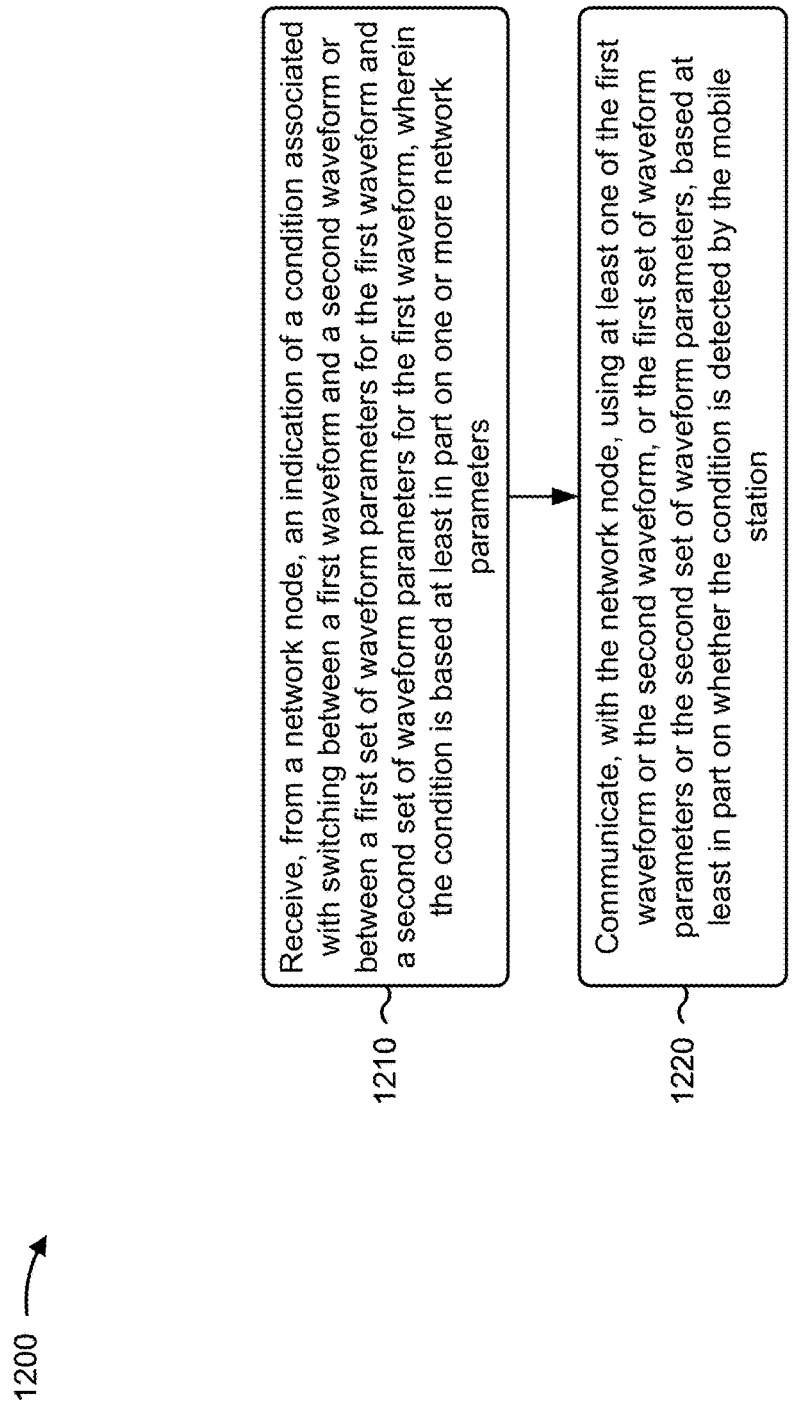
FIG. 12 is a diagram illustrating an example process performed, for example, by a mobile station, in accordance with the present disclosure.

FIG. 12 is a diagram illustrating an example process 1200 performed, for example, by a mobile station, in accordance with the present disclosure. Example process 1200 is an example where the mobile station (e.g., a UE 120) performs operations associated with network parameter based waveform parameters.

As shown in FIG. 12, in some aspects, process 1200 may include receiving, from a network node, an indication of a condition associated with switching between a first waveform and a second waveform or between a first set of waveform parameters for the first waveform and a second set of waveform parameters for the first waveform, wherein the condition is based at least in part on one or more network parameters (block 1210). For example, the mobile station (e.g., using communication manager 140 and/or reception component 1402, depicted in FIG. 14) may receive, from a network node, an indication of a condition associated with switching between a first waveform and a second waveform or between a first set of waveform parameters for the first waveform and a second set of waveform parameters for the first waveform, wherein the condition is based at least in part on one or more network parameters, as described above.

As further shown in FIG. 12, in some aspects, process 1200 may include communicating, with the network node, using at least one of: the first waveform or the second waveform, or the first set of waveform parameters or the second set of waveform parameters, based at least in part on whether the condition is detected by the mobile station (block 1220). For example, the mobile station (e.g., using communication manager 140, reception component 1402, and/or transmission component 1404, depicted in FIG. 14) may communicate, with the network node, using at least one of: the first waveform or the second waveform, or the first set of waveform parameters or the second set of waveform parameters, based at least in part on whether the condition is detected by the mobile station, as described above.

Process 1200 may include additional aspects, such as any single aspect or any combination of aspects described below and/or in connection with one or more other processes described elsewhere herein.

In a first aspect, the first waveform is a UW-OFDM waveform and the second waveform is a CP-OFDM waveform.

In a second aspect, alone or in combination with the first aspect, process 1200 includes receiving, from the network node, an indication of the one or more network parameters, and detecting the condition based at least in part on the indication of the one or more network parameters.

In a third aspect, alone or in combination with one or more of the first and second aspects, the one or more network parameters comprise at least one of a bandwidth allocation, a channel type, a channel condition, a physical channel associated with a slot or a symbol, an SNR measurement, an SINR measurement, or one or more waveform constraints.

In a fourth aspect, alone or in combination with one or more of the first through third aspects, waveform parameters, from the first set of waveform parameters and the second set of waveform parameters, comprise at least one of a quantity of redundant subcarriers, a modulation and coding scheme, a code rate, a transport block size, or a technique to be used to generate or place the redundant subcarriers within a bandwidth allocation.

In a fifth aspect, alone or in combination with one or more of the first through fourth aspects, process 1200 includes receiving, from the network node, a request for waveform parameters associated with the first waveform, and transmitting, to the network node, an indication of at least one of the first set of waveform parameters or the second set of waveform parameters based at least in part on receiving the request.

In a sixth aspect, alone or in combination with one or more of the first through fifth aspects, process 1200 includes performing one or more measurements of one or more channel parameters, and transmitting, to the network node, an indication of at least one of the first set of waveform parameters or the second set of waveform parameters, wherein the first set of waveform parameters or the second set of waveform parameters is selected based at least in part on the one or more measurements of the one or more channel parameters.

In a seventh aspect, alone or in combination with one or more of the first through sixth aspects, receiving the indication of the condition comprises receiving downlink control information that comprises the indication of the condition, and communicating with the network node comprises communicating a signal that is scheduled by the downlink control information.

In an eighth aspect, alone or in combination with one or more of the first through seventh aspects, receiving the indication of the condition comprises receiving a MAC control element communication that comprises the indication of the condition.

In a ninth aspect, alone or in combination with one or more of the first through eighth aspects, receiving the indication of the condition comprises receiving a radio resource control communication that comprises the indication of the condition.

In a tenth aspect, alone or in combination with one or more of the first through ninth aspects, receiving the indication of the condition comprises receiving an indication of an operating mode associated with the network node, wherein an interpretation of the condition is based at least in part on the operating mode.

In an eleventh aspect, alone or in combination with one or more of the first through tenth aspects, the operating mode is an error rate optimizing mode or a throughput optimizing mode.

In a twelfth aspect, alone or in combination with one or more of the first through eleventh aspects, at least one of the first set of waveform parameters or the second set of waveform parameters are associated with a first set of information or values for a first operating mode of the network node and a second set of information or values for a second operating mode of the network node.

In a thirteenth aspect, alone or in combination with one or more of the first through twelfth aspects, receiving the indication of the condition is based at least in part on one or more SNR measurements or one or more SINR measurements.

In a fourteenth aspect, alone or in combination with one or more of the first through thirteenth aspects, process 1200 includes receiving, from the network node, an indication of one or more measurement resources associated with switching waveforms or waveform parameters, and transmitting, to the network node, an indication of the one or more SNR measurements or the one or more SINR measurements that are performed using the one or more measurement resources.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
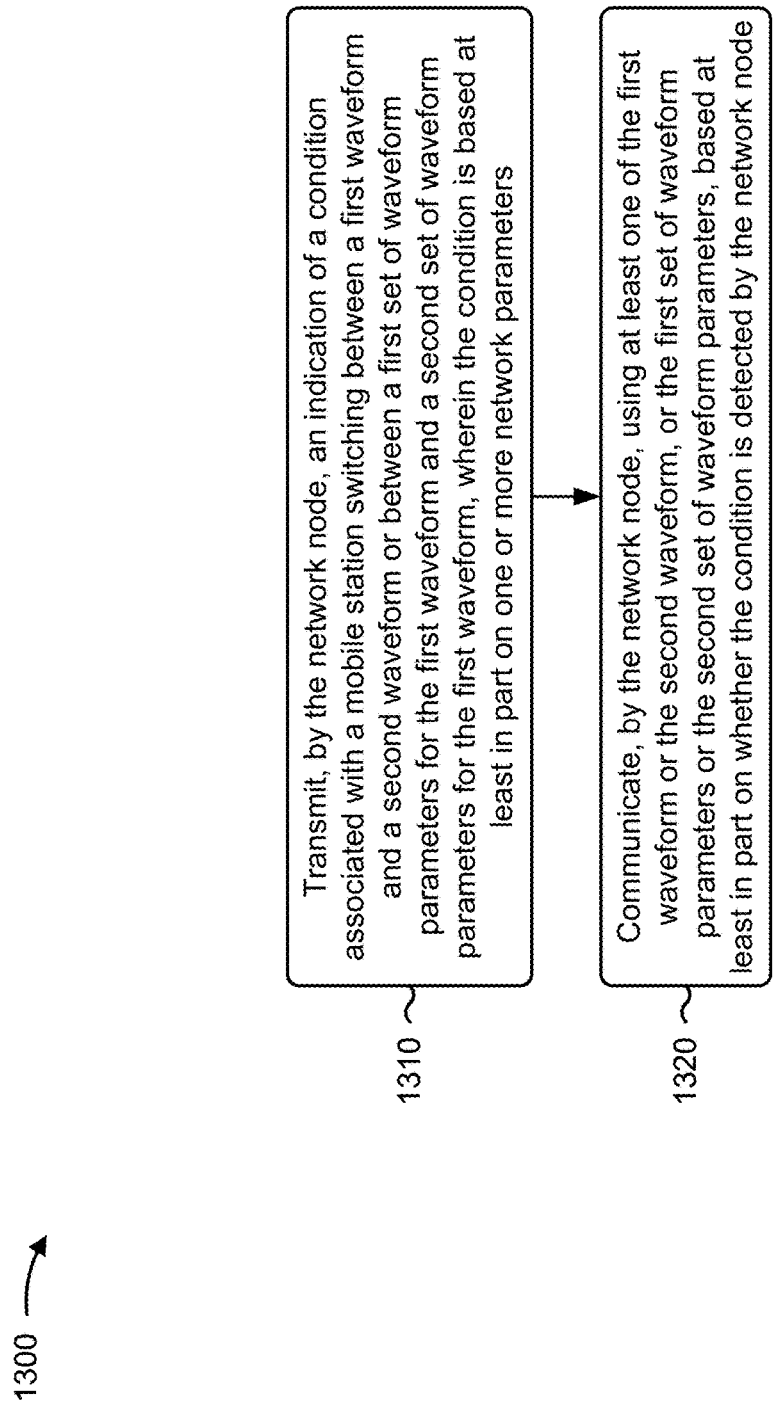
FIG. 13 is a diagram illustrating an example process performed, for example, by a network node, in accordance with the present disclosure.

FIG. 13 is a diagram illustrating an example process 1300 performed, for example, by a network node, in accordance with the present disclosure. Example process 1300 is an example where the network node (e.g., a network node 110) performs operations associated with network parameter based waveform parameters.

As shown in FIG. 13, in some aspects, process 1300 may include transmitting an indication of a condition associated with a mobile station switching between a first waveform and a second waveform or between a first set of waveform parameters for the first waveform and a second set of waveform parameters for the first waveform, wherein the condition is based at least in part on one or more network parameters (block 1310). For example, the network node (e.g., using communication manager 150 and/or transmission component 1504, depicted in FIG. 15) may transmit an indication of a condition associated with a mobile station switching between a first waveform and a second waveform or between a first set of waveform parameters for the first waveform and a second set of waveform parameters for the first waveform, wherein the condition is based at least in part on one or more network parameters, as described above.

As further shown in FIG. 13, in some aspects, process 1300 may include communicating using at least one of: the first waveform or the second waveform, or the first set of waveform parameters or the second set of waveform parameters, based at least in part on whether the condition is detected by the network node (block 1320). For example, the network node (e.g., using communication manager 150, reception component 1502, and/or transmission component 1504, depicted in FIG. 15) may communicate using at least one of: the first waveform or the second waveform, or the first set of waveform parameters or the second set of waveform parameters, based at least in part on whether the condition is detected by the network node, as described above.

Process 1300 may include additional aspects, such as any single aspect or any combination of aspects described below and/or in connection with one or more other processes described elsewhere herein.

In a first aspect, the first waveform is a UW-OFDM waveform and the second waveform is a CP-OFDM waveform.

In a second aspect, alone or in combination with the first aspect, process 1300 includes transmitting an indication intended for the mobile station of information or one or more measurement values associated with the one or more network parameters.

In a third aspect, alone or in combination with one or more of the first and second aspects, the one or more network parameters comprise at least one of a bandwidth allocation, a channel type, a channel condition, a physical channel associated with a slot or symbol, an SNR measurement, an SINR measurement, or one or more waveform constraints.

In a fourth aspect, alone or in combination with one or more of the first through third aspects, waveform parameters, from the first set of waveform parameters and the second set of waveform parameters, comprise at least one of a quantity of redundant subcarriers, a modulation and coding scheme, a code rate, a transport block size, or a technique to be used to generate or place the redundant subcarriers within a bandwidth allocation.

In a fifth aspect, alone or in combination with one or more of the first through fourth aspects, process 1300 includes transmitting a request intended for the mobile station for waveform parameters associated with the first waveform, and receiving an indication of at least one of the first set of waveform parameters or the second set of waveform parameters based at least in part on transmitting the request.

In a sixth aspect, alone or in combination with one or more of the first through fifth aspects, process 1300 includes selecting the at least one of the first set of waveform parameters or the second set of waveform parameters based at least in part on uplink channel measurements.

In a seventh aspect, alone or in combination with one or more of the first through sixth aspects, process 1300 includes receiving an indication, associated with the mobile station, of at least one of the first set of waveform parameters or the second set of waveform parameters, wherein the first set of waveform parameters or the second set of waveform parameters is selected based at least in part on one or more measurements of one or more channel parameters.

In an eighth aspect, alone or in combination with one or more of the first through seventh aspects, transmitting the indication of the condition comprises transmitting downlink control information that comprises the indication of the condition.

In a ninth aspect, alone or in combination with one or more of the first through eighth aspects, transmitting the indication of the condition comprises transmitting a MAC control element communication that comprises the indication of the condition.

In a tenth aspect, alone or in combination with one or more of the first through ninth aspects, transmitting the indication of the condition comprises transmitting a radio resource control communication that comprises the indication of the condition.

In an eleventh aspect, alone or in combination with one or more of the first through tenth aspects, transmitting the indication of the condition comprises transmitting an indication of an operating mode associated with the network node, wherein the condition is based at least in part on the operating mode.

In a twelfth aspect, alone or in combination with one or more of the first through eleventh aspects, the operating mode is an error rate optimizing mode or a throughput optimizing mode.

In a thirteenth aspect, alone or in combination with one or more of the first through twelfth aspects, at least one of the first set of waveform parameters or the second set of waveform parameters are associated with a first set of information or values for a first operating mode of the network node and a second set of information or values for a second operating mode of the network node.

In a fourteenth aspect, alone or in combination with one or more of the first through thirteenth aspects, transmitting the indication of the condition is based at least in part on one or more SNR measurements or one or more SINR measurements.

In a fifteenth aspect, alone or in combination with one or more of the first through fourteenth aspects, process 1300 includes transmitting an indication of one or more measurement resources, intended for the mobile station, that are associated with switching waveforms or waveform parameters receiving an indication, associated with the mobile station, of the one or more SNR measurements or the one or more SINR measurements that are associated with the one or more measurement resources.

In a sixteenth aspect, alone or in combination with one or more of the first through fifteenth aspects, process 1300 includes performing the one or more SNR measurements or the one or more SINR measurements.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
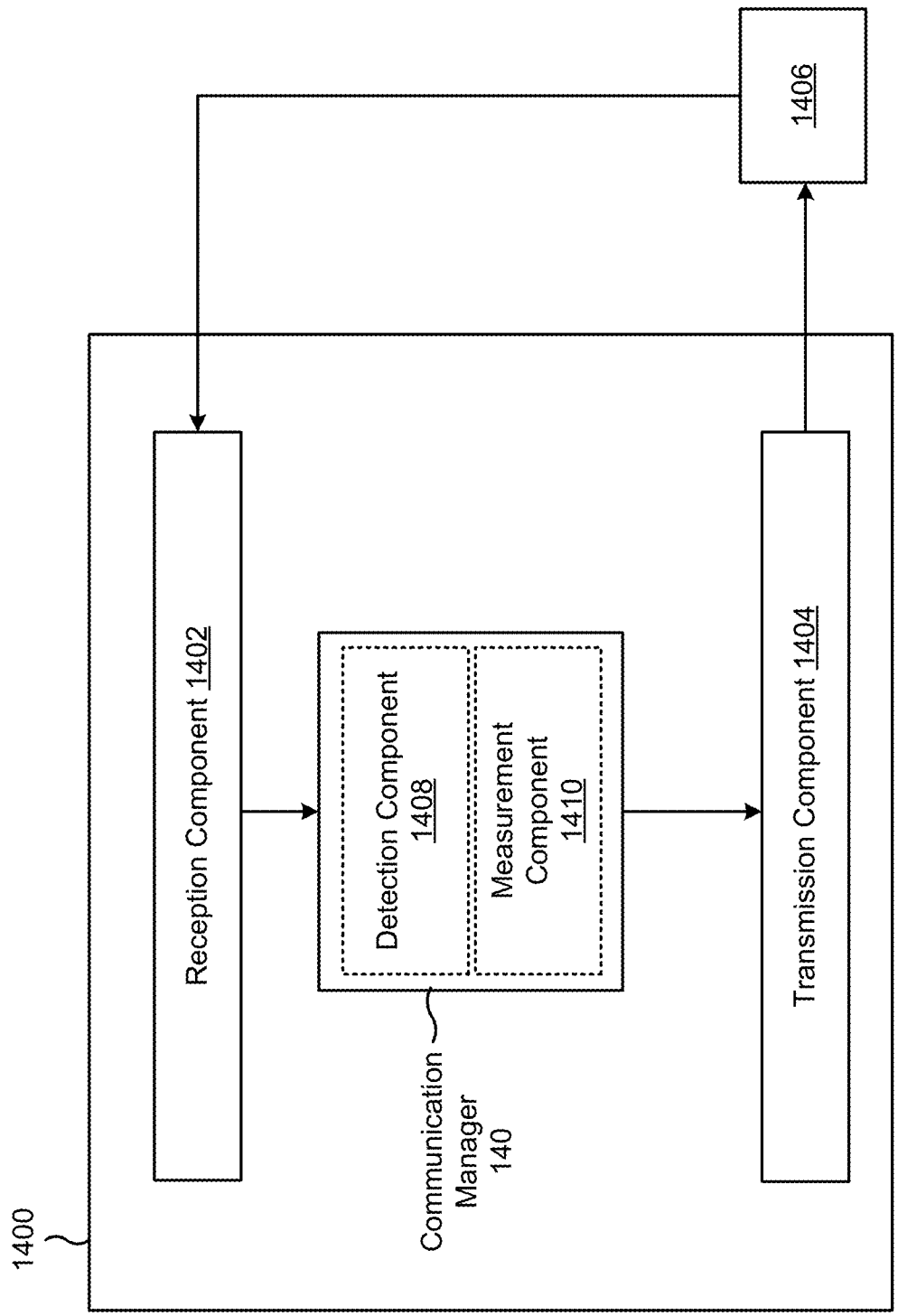
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a UE (e.g., a mobile station), or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, a network node, or another wireless communication device) using the reception component 1402 and the transmission component 1404. As further shown, the apparatus 1400 may include the communication manager 140. The communication manager 140 may include one or more of a detection component 1408, and/or a measurement component 1410, among other examples.

In some aspects, the apparatus 1400 may be configured to perform one or more operations described herein in connection with FIGS. 8-11. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2. In some aspects, the reception component 1402 may include or be included in an interface for communication with another apparatus, such as a network node.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver. In some aspects, the transmission component 1404 may include or be included in an interface for communication with another apparatus, such as a network node. In some aspects, the transmission component 1404 and/or the reception component 1402 may facilitate communication with one or more network nodes. For example, the transmission component 1404 and/or the reception component 1402 may not perform direct radio communication with a UE. In some other aspects, the transmission component 1404 and/or the reception component 1402 may perform direct radio communication with a UE.

The reception component 1402 may receive, from a network node, an indication of a condition associated with switching between a first waveform and a second waveform or between a first set of waveform parameters for the first waveform and a second set of waveform parameters for the first waveform, wherein the condition is based at least in part on one or more network parameters. The reception component 1402 and/or the transmission component 1404 may communicate, with the network node, using at least one of: the first waveform or the second waveform, or the first set of waveform parameters or the second set of waveform parameters, based at least in part on whether the condition is detected by the mobile station.

The reception component 1402 may receive, from the network node, an indication of information or one or more measurement values associated with the one or more network parameters.

The detection component 1408 may detect the condition based at least in part on the information or the one or more measurement values associated with the one or more network parameters.

The reception component 1402 may receive, from the network node, a request for waveform parameters associated with the first waveform.

The transmission component 1404 may transmit, to the network node, an indication of at least one of the first set of waveform parameters or the second set of waveform parameters based at least in part on receiving the request.

The measurement component 1410 may perform one or more measurements of one or more channel parameters.

The transmission component 1404 may transmit, to the network node, an indication of at least one of the first set of waveform parameters or the second set of waveform parameters, wherein the first set of waveform parameters or the second set of waveform parameters is selected based at least in part on the one or more measurements of the one or more channel parameters.

The reception component 1402 may receive, from the network node, an indication of one or more measurement resources associated with switching waveforms or waveform parameters.

The transmission component 1404 may transmit, to the network node, an indication of the one or more SNR measurements or the one or more SINR measurements that are performed using the one or more measurement resources.

The quantity and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
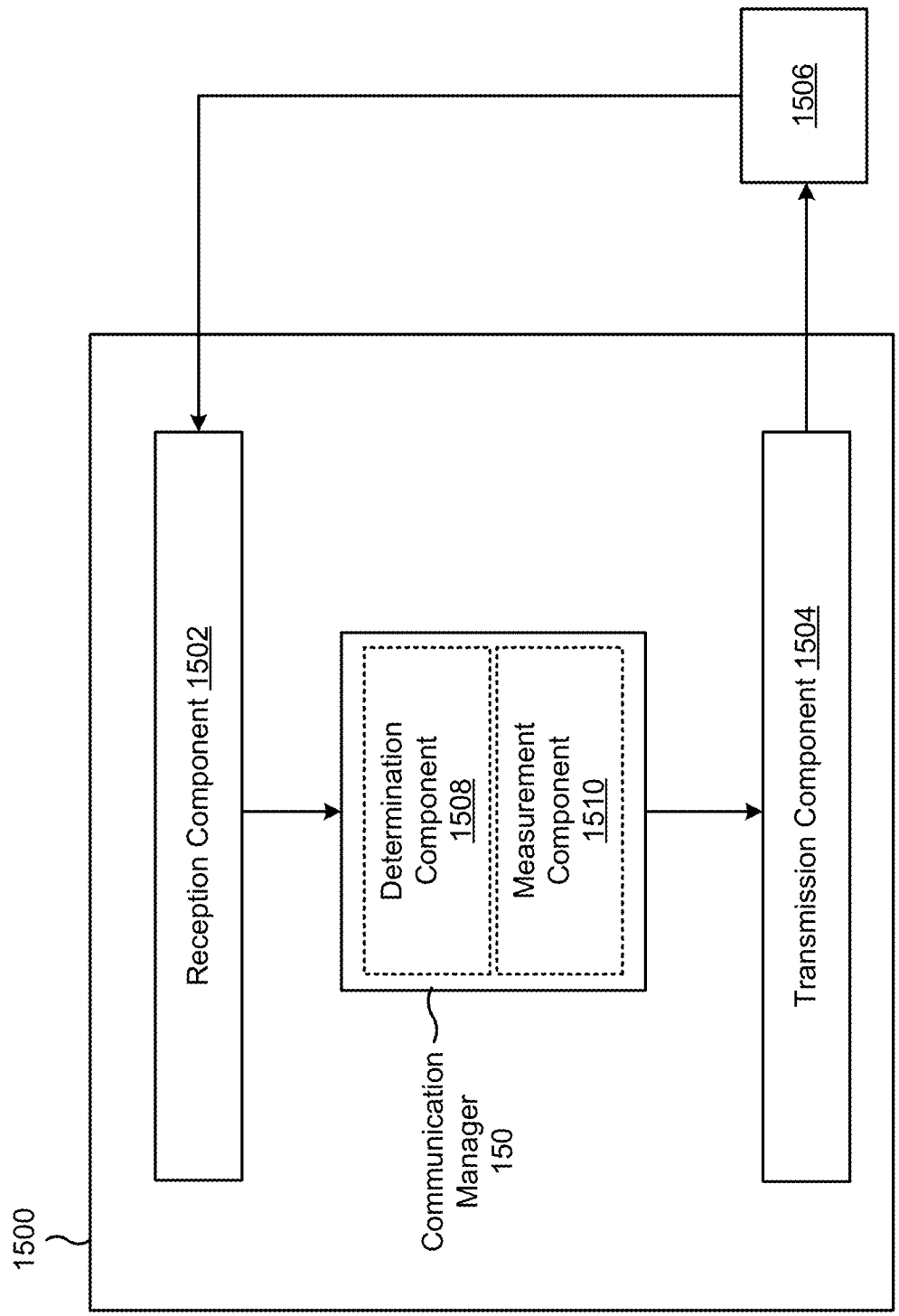
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a network node, or a network node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, a network node, or another wireless communication device) using the reception component 1502 and the transmission component 1504. As further shown, the apparatus 1500 may include the communication manager 150. The communication manager 150 may include one or more of a determination component 1508, and/or a measurement component 1510, among other examples.

In some aspects, the apparatus 1500 may be configured to perform one or more operations described herein in connection with FIGS. 8-11. Additionally, or alternatively, the apparatus 1500 may be configured to perform one or more processes described herein, such as process 1300 of FIG. 13, or a combination thereof. In some aspects, the apparatus 1500 and/or one or more components shown in FIG. 15 may include one or more components of the network node described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network node described in connection with FIG. 2. In some aspects, the reception component 1502 may include or be included in an interface for communication with another apparatus, such as a network node.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the network node described in connection with FIG. 2. In some aspects, the transmission component 1504 may be co-located with the reception component 1502 in a transceiver. In some aspects, the transmission component 1504 may include or be included in an interface for communication with another apparatus, such as a network node. In some aspects, the transmission component 1504 and/or the reception component 1502 may facilitate communication with one or more network nodes. For example, the transmission component 1504 and/or the reception component 1502 may not perform direct radio communication with a UE. In some other aspects, the transmission component 1504 and/or the reception component 1502 may perform direct radio communication with a UE.

The transmission component 1504 may transmit an indication of a condition associated with a mobile station switching between a first waveform and a second waveform or between a first set of waveform parameters for the first waveform and a second set of waveform parameters for the first waveform, wherein the condition is based at least in part on one or more network parameters. The reception component 1502 and/or the transmission component 1504 may communicate using at least one of: the first waveform or the second waveform, or the first set of waveform parameters or the second set of waveform parameters, based at least in part on whether the condition is detected by the network node.

The transmission component 1504 may transmit an indication intended for the mobile station of information or one or more measurement values associated with the one or more network parameters.

The transmission component 1504 may transmit a request intended for the mobile station for waveform parameters associated with the first waveform.

The reception component 1502 may receive an indication of at least one of the first set of waveform parameters or the second set of waveform parameters based at least in part on transmitting the request.

The determination component 1508 may select the at least one of the first set of waveform parameters or the second set of waveform parameters based at least in part on uplink channel measurements.

The reception component 1502 may receive an indication, associated with the mobile station, of at least one of the first set of waveform parameters or the second set of waveform parameters, wherein the first set of waveform parameters or the second set of waveform parameters is selected based at least in part on one or more measurements of one or more channel parameters.

The transmission component 1504 may transmit an indication of one or more measurement resources, intended for the mobile station, that are associated with switching waveforms or waveform parameters.

The reception component 1502 may receive an indication, associated with the mobile station, of the one or more SNR measurements or the one or more SINR measurements that are associated with the one or more measurement resources.

The measurement component 1510 may perform the one or more SNR measurements or the one or more SINR measurements.

The quantity and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a mobile station, comprising: receiving, by the mobile station and from a network node, an indication of a condition associated with switching between a first waveform and a second waveform or between a first set of waveform parameters for the first waveform and a second set of waveform parameters for the first waveform, wherein the condition is based at least in part on one or more network parameters; and communicating, by the mobile station and with the network node, using at least one of: the first waveform or the second waveform, or the first set of waveform parameters or the second set of waveform parameters, based at least in part on whether the condition is detected by the mobile station.

Aspect 2: The method of Aspect 1, wherein the first waveform is a unique word (UW) orthogonal frequency division multiplexing (OFDM) (UW-OFDM) waveform and the second waveform is a cyclic prefix OFDM (CP-OFDM) waveform.

Aspect 3: The method of any of Aspects 1-2, further comprising: receiving, from the network node, an indication of the one or more network parameters; and detecting the condition based at least in part on the indication of the one or more network parameters.

Aspect 4: The method of any of Aspects 1-3, wherein the one or more network parameters comprise at least one of: a bandwidth allocation, a channel type, a channel condition, a physical channel associated with a slot or a symbol, a signal-to-noise ratio (SNR) measurement, a signal-to-noise-plus-interference ratio (SINR) measurement, or one or more waveform constraints.

Aspect 5: The method of any of Aspects 1-4, wherein waveform parameters, from the first set of waveform parameters and the second set of waveform parameters, comprise at least one of: a quantity of redundant subcarriers, a modulation and coding scheme, a code rate, a transport block size, or a technique to be used to generate or place the redundant subcarriers within a bandwidth allocation.

Aspect 6: The method of any of Aspects 1-5, further comprising: receiving, from the network node, a request for waveform parameters associated with the first waveform; and transmitting, to the network node, an indication of at least one of the first set of waveform parameters or the second set of waveform parameters based at least in part on receiving the request.

Aspect 7: The method of any of Aspects 1-6, further comprising: performing one or more measurements of one or more channel parameters; and transmitting, to the network node, an indication of at least one of the first set of waveform parameters or the second set of waveform parameters, wherein the first set of waveform parameters or the second set of waveform parameters is selected based at least in part on the one or more measurements of the one or more channel parameters.

Aspect 8: The method of any of Aspects 1-7, wherein receiving the indication of the condition comprises: receiving downlink control information that comprises the indication of the condition; and wherein communicating with the network node comprises: communicating a signal that is scheduled by the downlink control information.

Aspect 9: The method of any of Aspects 1-7, wherein receiving the indication of the condition comprises: receiving a medium access control (MAC) control element communication that comprises the indication of the condition.

Aspect 10: The method of any of Aspects 1-7, wherein receiving the indication of the condition comprises: receiving a radio resource control communication that comprises the indication of the condition.

Aspect 11: The method of any of Aspects 1-10, wherein receiving the indication of the condition comprises: receiving an indication of an operating mode associated with the network node, wherein an interpretation of the condition is based at least in part on the operating mode.

Aspect 12: The method of Aspect 11, wherein the operating mode is an error rate optimizing mode or a throughput optimizing mode.

Aspect 13: The method of any of Aspects 1-12, wherein at least one of the first set of waveform parameters or the second set of waveform parameters are associated with a first set of information or values for a first operating mode of the network node and a second set of information or values for a second operating mode of the network node.

Aspect 14: The method of any of Aspects 1-13, wherein the indication of the condition is based at least in part on one or more signal-to-noise ratio (SNR) measurements or one or more signal-to-noise-plus-interference ratio (SINK) measurements.

Aspect 15: The method of Aspect 14, further comprising: receiving, from the network node, an indication of one or more measurement resources associated with switching waveforms or waveform parameters; and transmitting, to the network node, an indication of the one or more SNR measurements or the one or more SINR measurements that are performed using the one or more measurement resources.

Aspect 16: A method of wireless communication performed by a network node, comprising: transmitting, by the network node, an indication of a condition associated with a mobile station switching between a first waveform and a second waveform or between a first set of waveform parameters for the first waveform and a second set of waveform parameters for the first waveform, wherein the condition is based at least in part on one or more network parameters; and communicating, by the network node, using at least one of: the first waveform or the second waveform, or the first set of waveform parameters or the second set of waveform parameters, based at least in part on whether the condition is detected by the network node.

Aspect 17: The method of Aspect 16, wherein the first waveform is a unique word (UW) orthogonal frequency division multiplexing (OFDM) (UW-OFDM) waveform and the second waveform is a cyclic prefix OFDM (CP-OFDM) waveform.

Aspect 18: The method of any of Aspects 16-17, further comprising: transmitting an indication intended for the mobile station of information or one or more measurement values associated with the one or more network parameters.

Aspect 19: The method of any of Aspects 16-18, wherein the one or more network parameters comprise at least one of: a bandwidth allocation, a channel type, a channel condition, a physical channel associated with a slot or symbol, a signal-to-noise ratio (SNR) measurement, a signal-to-noise-plus-interference ratio (SINR) measurement, or one or more waveform constraints.

Aspect 20: The method of any of Aspects 16-19, wherein waveform parameters, from the first set of waveform parameters and the second set of waveform parameters, comprise at least one of: a quantity of redundant subcarriers, a modulation and coding scheme, a code rate, a transport block size, or a technique to be used to generate or place the redundant subcarriers within a bandwidth allocation.

Aspect 21: The method of any of Aspects 16-20, further comprising: transmitting a request intended for the mobile station for waveform parameters associated with the first waveform; and receiving an indication of at least one of the first set of waveform parameters or the second set of waveform parameters based at least in part on transmitting the request.

Aspect 22: The method of any of Aspects 16-21, further comprising: selecting the at least one of the first set of waveform parameters or the second set of waveform parameters based at least in part on uplink channel measurements.

Aspect 23: The method of any of Aspects 16-22, further comprising: receiving an indication, associated with the mobile station, of at least one of the first set of waveform parameters or the second set of waveform parameters, wherein the first set of waveform parameters or the second set of waveform parameters is selected based at least in part on one or more measurements of one or more channel parameters.

Aspect 24: The method of any of Aspects 16-23, wherein transmitting the indication of the condition comprises: transmitting downlink control information that comprises the indication of the condition.

Aspect 25: The method of any of Aspects 16-23, wherein transmitting the indication of the condition comprises: transmitting a medium access control (MAC) control element communication that comprises the indication of the condition.

Aspect 26: The method of any of Aspects 16-23, wherein transmitting the indication of the condition comprises: transmitting a radio resource control communication that comprises the indication of the condition.

Aspect 27: The method of any of Aspects 16-26, wherein transmitting the indication of the condition comprises: transmitting an indication of an operating mode associated with the network node, wherein the condition is based at least in part on the operating mode.

Aspect 28: The method of Aspect 27, wherein the operating mode is an error rate optimizing mode or a throughput optimizing mode.

Aspect 29: The method of any of Aspects 16-28, wherein at least one of the first set of waveform parameters or the second set of waveform parameters are associated with a first set of information or values for a first operating mode of the network node and a second set of information or values for a second operating mode of the network node.

Aspect 30: The method of any of Aspects 16-29, wherein the indication of the condition is based at least in part on one or more signal-to-noise ratio (SNR) measurements or one or more signal-to-noise-plus-interference ratio (SINK) measurements.

Aspect 31: The method of Aspect 30, further comprising: transmitting an indication of one or more measurement resources, intended for the mobile station, that are associated with switching waveforms or waveform parameters receiving an indication, associated with the mobile station, of the one or more SNR measurements or the one or more SINK measurements that are associated with the one or more measurement resources.

Aspect 32: The method of Aspect 30, further comprising: performing the one or more SNR measurements or the one or more SINR measurements.

Aspect 33: An apparatus for wireless communication at a device, comprising a processor; memory coupled with the processor; and instructions stored in the memory and executable by the processor to cause the apparatus to perform the method of one or more of Aspects 1-15.

Aspect 34: A device for wireless communication, comprising a memory and one or more processors coupled to the memory, the one or more processors configured to perform the method of one or more of Aspects 1-15.

Aspect 35: An apparatus for wireless communication, comprising at least one means for performing the method of one or more of Aspects 1-15.

Aspect 36: A non-transitory computer-readable medium storing code for wireless communication, the code comprising instructions executable by a processor to perform the method of one or more of Aspects 1-15.

Aspect 37: A non-transitory computer-readable medium storing a set of instructions for wireless communication, the set of instructions comprising one or more instructions that, when executed by one or more processors of a device, cause the device to perform the method of one or more of Aspects 1-15.

Aspect 38: An apparatus for wireless communication at a device, comprising a processor; memory coupled with the processor; and instructions stored in the memory and executable by the processor to cause the apparatus to perform the method of one or more of Aspects 16-32.

Aspect 39: A device for wireless communication, comprising a memory and one or more processors coupled to the memory, the one or more processors configured to perform the method of one or more of Aspects 16-32.

Aspect 40: An apparatus for wireless communication, comprising at least one means for performing the method of one or more of Aspects 16-32.

Aspect 41: A non-transitory computer-readable medium storing code for wireless communication, the code comprising instructions executable by a processor to perform the method of one or more of Aspects 16-32.

Aspect 42: A non-transitory computer-readable medium storing a set of instructions for wireless communication, the set of instructions comprising one or more instructions that, when executed by one or more processors of a device, cause the device to perform the method of one or more of Aspects 16-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a mobile station, comprising:
   one or more memories; and
   one or more processors, based at least in part on information stored in the one or more memories, configured to:
      receive, from a network node, an indication of a condition associated with switching between a first waveform and a second waveform or between a first set of waveform parameters for the first waveform and a second set of waveform parameters for the first waveform, wherein the condition is based at least in part on an operating mode of the network node, wherein the operating mode is an error rate optimizing mode or a throughput optimizing mode;
      receive, from the network node, configuration information that indicates that the mobile station is to use the first set of waveform parameters if the network node is operating in the error rate optimizing mode and the second set of waveform parameters if the network node is operating in the throughput optimizing mode; and
      communicate, with the network node, using at least one of:
         the first waveform or the second waveform, or
         the first set of waveform parameters or the second set of waveform parameters, based at least in part on whether the condition is detected by the mobile station.

2. The apparatus of claim 1, wherein the first waveform is a unique word (UW) orthogonal frequency division multiplexing (OFDM) (UW-OFDM) waveform and the second waveform is a cyclic prefix OFDM (CP-OFDM) waveform.

3. The apparatus of claim 1, wherein the one or more processors are further configured to:
   receive, from the network node, an indication of one or more network parameters; and
   detect the condition based at least in part on the indication of the one or more network parameters.

4. The apparatus of claim 1, wherein the one or more processors are further configured to:
   receive, from the network node, a request for waveform parameters associated with the first waveform; and
   transmit, to the network node, an indication of at least one of the first set of waveform parameters or the second set of waveform parameters based at least in part on receiving the request.

5. The apparatus of claim 1, wherein the one or more processors are further configured to:
 perform one or more measurements of one or more channel parameters; and
 transmit, to the network node, an indication of at least one of the first set of waveform parameters or the second set of waveform parameters,
  wherein the first set of waveform parameters or the second set of waveform parameters is selected based at least in part on the one or more measurements of the one or more channel parameters.

6. The apparatus of claim 1, wherein the one or more processors, to receive the indication of the condition, are configured to:
 receive downlink control information that comprises the indication of the condition; and
 wherein the one or more processors, to communicate with the network node, are configured to:
  communicate a signal that is scheduled by the downlink control information.

7. The apparatus of claim 1, wherein the one or more processors, to receive the indication of the condition, are configured to cause the mobile station to:
 receive a medium access control (MAC) control element communication that comprises the indication of the condition or a radio resource control communication that comprises the indication of the condition.

8. The apparatus of claim 1, wherein the one or more processors, to receive the indication of the condition, are configured to:
 receive an indication of the operating mode, wherein an interpretation of the condition is based at least in part on the operating mode.

9. The apparatus of claim 1, wherein at least one of the first set of waveform parameters or the second set of waveform parameters are associated with a first set of information or values for a first operating mode of the network node and a second set of information or values for a second operating mode of the network node, wherein the first operating mode is the error rate optimizing mode and the second operating mode is the throughput optimizing mode.

10. The apparatus of claim 1, wherein the indication of the condition is based at least in part on one or more signal-to-noise ratio (SNR) measurements or one or more signal-to-noise-plus-interference ratio (SINR) measurements.

11. An apparatus for wireless communication at a network node, comprising:
 one or more memories; and
 one or more processors, based at least in part on information stored in the one or more memories, configured to:
  transmit an indication of a condition associated with a mobile station switching between a first waveform and a second waveform or between a first set of waveform parameters for the first waveform and a second set of waveform parameters for the first waveform, wherein the condition is based at least in part on an operating mode of the network node, wherein the operating mode is an error rate optimizing mode or a throughput optimizing mode;
  transmit, to the mobile station, configuration information that indicates that the mobile station is to use the first set of waveform parameters if the network node is operating in the error rate optimizing mode and the second set of waveform parameters if the network node is operating in the throughput optimizing mode; and
  communicate using at least one of:
   the first waveform or the second waveform, or
   the first set of waveform parameters or the second set of waveform parameters, based at least in part on whether the condition is detected by the network node.

12. The apparatus of claim 11, wherein the one or more processors are further configured to:
 transmit an indication intended for the mobile station of information or one or more measurement values associated with one or more network parameters.

13. The apparatus of claim 11, wherein the one or more processors are further configured to:
 transmit a request intended for the mobile station for waveform parameters associated with the first waveform; and
 receive an indication of at least one of the first set of waveform parameters or the second set of waveform parameters based at least in part on transmitting the request.

14. The apparatus of claim 11, wherein the one or more processors are further configured to:
 receive an indication, associated with the mobile station, of at least one of the first set of waveform parameters or the second set of waveform parameters, wherein the first set of waveform parameters or the second set of waveform parameters is selected based at least in part on one or more measurements of one or more channel parameters.

15. The apparatus of claim 11, wherein the one or more processors, to transmit the indication of the condition, are configured to:
 transmit at least one of a downlink control information, medium access control (MAC) control element communication, or a radio resource control communication that comprises the indication of the condition.

16. A method of wireless communication performed by a mobile station, comprising:
 receiving, by the mobile station and from a network node, an indication of a condition associated with switching between a first waveform and a second waveform or between a first set of waveform parameters for the first waveform and a second set of waveform parameters for the first waveform, wherein the condition is based at least in part on an operating mode of the network node, wherein the operating mode is an error rate optimizing mode or a throughput optimizing mode;
 receiving, from the network node, configuration information that indicates that the mobile station is to use the first set of waveform parameters if the network node is operating in the error rate optimizing mode and the second set of waveform parameters if the network node is operating in the throughput optimizing mode; and
 communicating, by the mobile station and with the network node, using at least one of:
  the first waveform or the second waveform, or
  the first set of waveform parameters or the second set of waveform parameters, based at least in part on whether the condition is detected by the mobile station.

17. The method of claim 16, further comprising:
 receiving, from the network node, an indication of one or more network parameters; and
 detecting the condition based at least in part on the indication of the one or more network parameters.

18. The method of claim 17, wherein the one or more network parameters comprise at least one of:
- a bandwidth allocation,
- a channel type,
- a channel condition,
- a physical channel associated with a slot or a symbol,
- a signal-to-noise ratio (SNR) measurement,
- a signal-to-noise-plus-interference ratio (SINR) measurement, or
- one or more waveform constraints.

19. The method of claim 16, wherein waveform parameters, from the first set of waveform parameters and the second set of waveform parameters, comprise at least one of:
- a quantity of redundant subcarriers,
- a modulation and coding scheme,
- a code rate,
- a transport block size, or
- a technique to be used to generate or place the redundant subcarriers within a bandwidth allocation.

20. The method of claim 16, further comprising:
- receiving, from the network node, a request for waveform parameters associated with the first waveform; and
- transmitting, to the network node, an indication of at least one of the first set of waveform parameters or the second set of waveform parameters based at least in part on receiving the request.

21. The method of claim 16, wherein receiving the indication of the condition comprises:
- receiving downlink control information that comprises the indication of the condition; and
- wherein communicating with the network node comprises:
  - communicating a signal that is scheduled by the downlink control information.

22. The method of claim 16, wherein receiving the indication of the condition comprises:
- receiving a medium access control (MAC) control element communication that comprises the indication of the condition or a radio resource control communication that comprises the indication of the condition.

23. The method of claim 16, wherein receiving the indication of the condition comprises:
- receiving an indication of the operating mode, wherein an interpretation of the condition is based at least in part on the operating mode.

24. The method of claim 16, wherein the error rate optimizing mode is a block error rate optimizing mode.

25. The method of claim 16, wherein at least one of the first set of waveform parameters or the second set of waveform parameters are associated with a first set of information or values for a first operating mode of the network node and a second set of information or values for a second operating mode of the network node, wherein the first operating mode is the error rate optimizing mode and the second operating mode is the throughput optimizing mode.

26. The method of claim 16, wherein the indication of the condition is based at least in part on one or more signal-to-noise ratio (SNR) measurements or one or more signal-to-noise-plus-interference ratio (SINR) measurements.

27. The method of claim 26, further comprising:
- receiving, from the network node, an indication of one or more measurement resources associated with switching waveforms or waveform parameters; and
- transmitting, to the network node, an indication of the one or more SNR measurements or the one or more SINR measurements that are performed using the one or more measurement resources.

28. A method of wireless communication performed by a network node, comprising:
- transmitting, by the network node, an indication of a condition associated with a mobile station switching between a first waveform and a second waveform or between a first set of waveform parameters for the first waveform and a second set of waveform parameters for the first waveform, wherein the condition is based at least in part on an operating mode of the network node, wherein the operating mode is an error rate optimizing mode or a throughput optimizing mode;
- transmitting, by the network node and to the mobile station, configuration information that indicates that the mobile station is to use the first set of waveform parameters if the network node is operating in the error rate optimizing mode and the second set of waveform parameters if the network node is operating in the throughput optimizing mode; and
- communicating, by the network node, using at least one of:
  - the first waveform or the second waveform, or
  - the first set of waveform parameters or the second set of waveform parameters, based at least in part on whether the condition is detected by the network node.

29. The method of claim 28, wherein transmitting the indication of the condition comprises:
- transmitting an indication of the operating mode.

30. The method of claim 28, further comprising:
- transmitting an indication of one or more measurement resources, intended for the mobile station, that are associated with switching waveforms or waveform parameters.

* * * * *